(12) United States Patent
Kanigsberg et al.

(10) Patent No.: US 8,122,047 B2
(45) Date of Patent: *Feb. 21, 2012

(54) RECOMMENDATION SYSTEMS AND METHODS USING INTEREST CORRELATION

(75) Inventors: Issar Amit Kanigsberg, Aurora (CA); Daniel Marc Veidlinger, Chico, CA (US); Tamer El Shazli, Mississauga (CA); Myer Joshua Mozersky, Kingston (CA)

(73) Assignee: Kit Digital Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/781,542

(22) Filed: May 17, 2010

(65) Prior Publication Data

US 2010/0318423 A1    Dec. 16, 2010

Related U.S. Application Data

(63) Continuation of application No. 11/807,191, filed on May 25, 2007, now Pat. No. 7,734,641.

(51) Int. Cl.
*G06F 7/00* (2006.01)
*G06F 17/30* (2006.01)
(52) U.S. Cl. .................. 707/765; 707/769; 707/776
(58) Field of Classification Search ........... 707/600–831
See application file for complete search history.

(56) References Cited

U.S. PATENT DOCUMENTS

| | | | |
|---|---|---|---|
| 6,470,307 B1 | 10/2002 | Turney | |
| 6,816,857 B1 | 11/2004 | Weissman et al. | |
| 6,826,559 B1 | 11/2004 | Ponte | |
| 6,829,599 B2 * | 12/2004 | Chidlovskii | 1/1 |
| 7,089,236 B1 | 8/2006 | Stibel | |
| 2002/0173971 A1 | 11/2002 | Stirpe et al. | |
| 2003/0101182 A1 | 5/2003 | Govrin et al. | |
| 2003/0177112 A1 | 9/2003 | Gardner | |
| 2004/0181520 A1 | 9/2004 | Imaichi et al. | |
| 2005/0080775 A1 | 4/2005 | Colledge et al. | |
| 2005/0193054 A1 | 9/2005 | Wilson et al. | |

(Continued)

FOREIGN PATENT DOCUMENTS

WO    WO 01/02996 A1    1/2001

OTHER PUBLICATIONS

Marco Gonzalez et al., Semantic thesaurus for automatic expanded query in information retrieval, 2001, IEEE, 68-75.*

(Continued)

*Primary Examiner* — Jean B Fleurantin
(74) *Attorney, Agent, or Firm* — Hamilton, Brook, Smith & Reynolds, P.C.

(57) ABSTRACT

A search technology generates recommendations with minimal user data and participation, and provides better interpretation of user data, such as popularity, thus obtaining breadth and quality in recommendations. It is sensitive to the semantic content of natural language terms and lets users briefly describe the intended recipient (i.e., interests, eccentricities, previously successful gifts). Based on that input, the recommendation software system and method determines the meaning of the entered terms and creatively discover connections to gift recommendations from the vast array of possibilities. The user may then make a selection from these recommendations. The search/recommendation engine allows the user to find gifts through connections that are not limited to previously available information on the Internet. Thus, interests can be connected to buying behavior by relating terms to respective items.

17 Claims, 42 Drawing Sheets

U.S. PATENT DOCUMENTS

| | | |
|---|---|---|
| 2005/0222989 A1 | 10/2005 | Haveliwala et al. |
| 2006/0036592 A1 | 2/2006 | Das et al. |
| 2006/0059119 A1 | 3/2006 | Canright et al. |
| 2006/0074836 A1 | 4/2006 | Gardner et al. |
| 2006/0167946 A1 | 7/2006 | Hellman et al. |
| 2006/0259344 A1 | 11/2006 | Patel et al. |
| 2006/0282328 A1 | 12/2006 | Gerace et al. |
| 2006/0294084 A1 | 12/2006 | Patel et al. |
| 2007/0033531 A1 | 2/2007 | Marsh |
| 2007/0067157 A1 | 3/2007 | Kaku et al. |
| 2007/0121843 A1 | 5/2007 | Atazky et al. |
| 2007/0255721 A1 | 11/2007 | Chess et al. |
| 2008/0004959 A1 | 1/2008 | Tunguz-Zawislak et al. |
| 2008/0294621 A1 | 11/2008 | Kanigsberg et al. |
| 2008/0294622 A1 | 11/2008 | Kanigsberg et al. |
| 2008/0294624 A1 | 11/2008 | Kanigsberg et al. |

OTHER PUBLICATIONS

Abramowitz, M. and Stegun, I. A., eds. Handbook of Mathematical Functions with Formulas, Graphs, and Mathematical Tables, New York: Dover, 1972 (See Chapter 7).

"Review of Personalization Technologies: Collaborative Filtering vs. ChoiceStream's Attributed Bayesian Chose Modeling," *ChoiceStream Technology Brief*, pp. 1-13, May 17, 2010.

Invitation To Pay Additional Fees from the International Searching Authority, PCT/US08/05258, 2 pp., dated Sep. 2, 2008.

International Search Report and Written Opinion of the International Searching Authority, PCT/US08/05258, 15 pp., dated Nov. 17, 2008.

Chin-Hwa Kuo, et al., "CanFind—a Semantic Image Indexing and Retrieval System," *IEEE*, pp. II-644-II-647, (2003).

Khan, L., et al., "Ontology Construction for Information Selection," *IEEE*, pp. 122-127 (2002).

U.S. Patent and Trademark Office Action dated Jun. 24, 2009, U.S. Appl. No. 11/807,218 (published application US-2008-0294622-A1), now abandoned, 23 pp.

U.S. Patent and Trademark Office Action dated Nov. 20, 2009, U.S. Appl. No. 11/807,191, now U.S. Patent No. 7,734,641, 19 pp.

U.S. Appl. No. 11/981,648, Office Action dated Oct. 13, 2010, 6 pp.

Li, J. et al., "Understanding and Predicting Dynamical Behaviours in Financial Markets: Financial Application Research in CERCIA," The University of Birmingham, UK.

Tang, Y., et al., "How effective and efficient are multiobjective evolutionary algorithms at hydrologic model calibration?" *Hydrol. Earth Syst. Sci.*, 10: 289-307 (2006).

Liu, J., and Hitoshi, I., "Selecting Information Genes Using Multiobjective Evolutionary Algorithm,"*IEEE*, (2002).

Jordan, P., et al., "Evaluation of Dual Polarization Radar For Rainfall-Runoff Modelling—A Case Study in Sydney, Australia" Sixth International Symposium on Hydrological Applications of Weather Radar (Feb. 2004).

Becker, J. and Kuropka D., "Topic-based Vector Space Model," In Proceedings of the 6th International Conference on Business Information Systems (Jul. 2003).

* cited by examiner

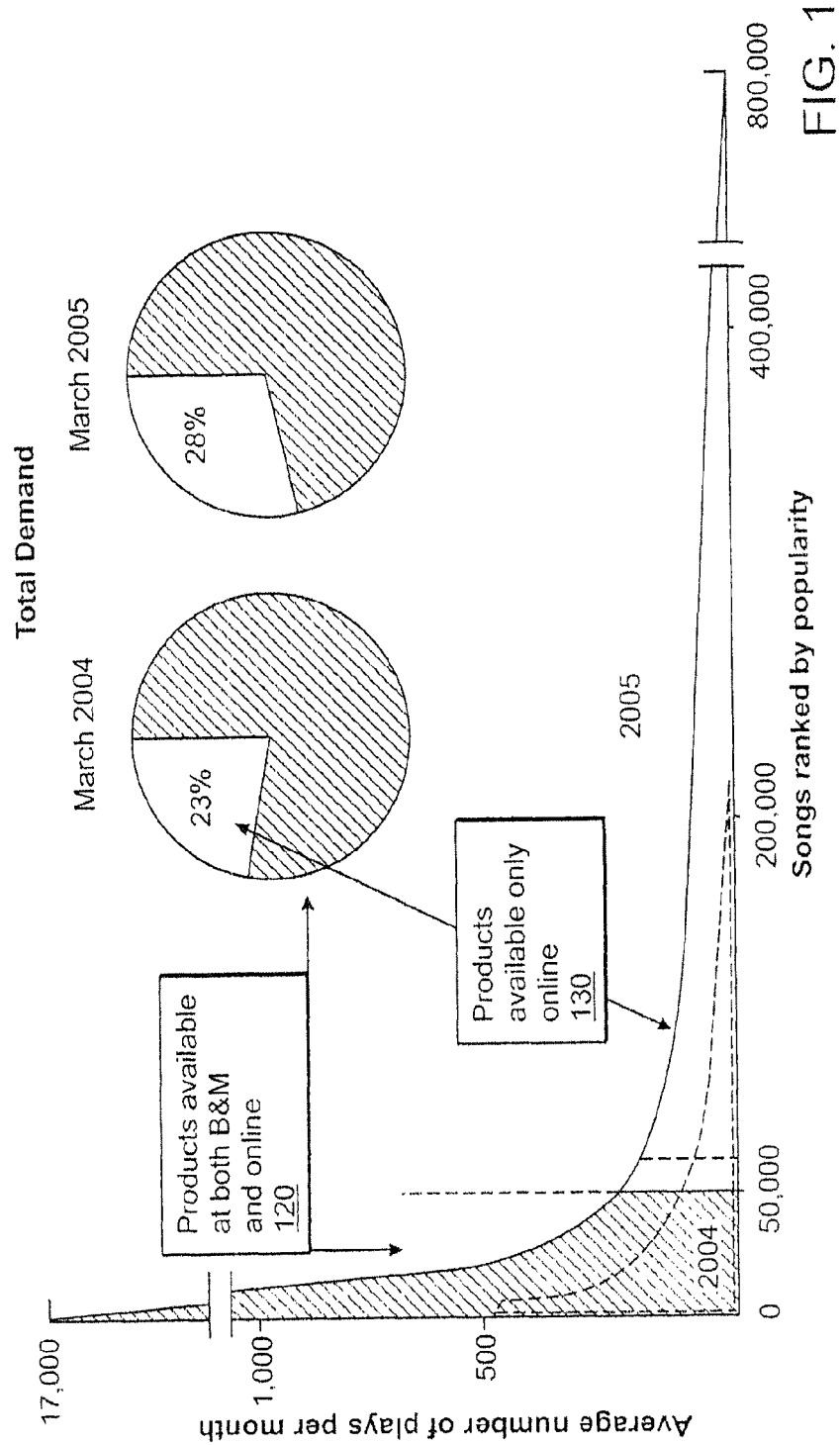

Typical Dating Site Profile

392 http://www.DatingSiteExample....

UserName: Looking4NiceMan

Gender: Female

I am looking for an interesting and intelligent man 23-30 who knows what he wants but is gentle and understanding. I am a little shy at first but can be very fun once I get to know someone.

393

Her Keywords: funloving, warm, romantic, philosophy, long walks, mountain climbing, Tolstoy, dancing, Peter Gabriel, humor Click Here to send a message to:
Looking4NiceMan

FIG. 3C

| Related Term | O-Variant | R-Factor | Correlation |
|---|---|---|---|
| nature | 3573 | 1 | 86.7551 |
| ecology | 27 | 0.007556675 | 33.46282 |
| conservation | 14 | 0.003918276 | 28.91845 |
| healing | 14 | 0.003918276 | 22.4922 |
| world music | 13 | 0.003638399 | 19.44514 |
| environment | 41 | 0.01147495 | 18.72089 |
| earth | 28 | 0.007836552 | 18.54314 |
| forest | 25 | 0.006996921 | 18.07406 |
| different cultures | 12 | 0.003358522 | 17.94936 |
| wildlife | 49 | 0.01371397 | 17.78667 |
| mystic | 8 | 0.002239015 | 17.35105 |
| celtic music | 8 | 0.002239015 | 15.77371 |
| forests | 21 | 0.005877414 | 15.57149 |
| spirit | 19 | 0.00531766 | 15.1225 |
| organic | 18 | 0.005037783 | 14.59436 |
| trekking | 13 | 0.003638399 | 14.45921 |
| wind | 19 | 0.00531766 | 13.51107 |
| paganism | 18 | 0.005037783 | 13.347 |
| reiki | 16 | 0.004478029 | 13.21986 |
| optimism | 14 | 0.003918276 | 13.20192 |

FIG. 4A

| nature,canada | | Search | |
|---|---|---|---|
| Related Term | O-Variant | R-Factor | Correlation |
| canada | 64 | 1 | 118.4475 |
| nature | 64 | 1 | 86.7551 |
| mountains | 8 | 0.125 | 12.12368 |
| skiing | 9 | 0.140625 | 5.560015 |
| hiking | 12 | 0.1875 | 5.355766 |
| animals | 10 | 0.15625 | 5.231001 |
| art | 9 | 0.140625 | 5.040539 |
| reading | 15 | 0.234375 | 3.978473 |
| travel | 15 | 0.234375 | 3.903023 |
| outdoors | 13 | 0.203125 | 3.489671 |
| cooking | 9 | 0.140625 | 3.276498 |
| photography | 16 | 0.25 | 3.253738 |
| hockey | 12 | 0.1875 | 3.039307 |
| tattoos | 10 | 0.15625 | 2.915248 |
| camping | 13 | 0.203125 | 2.700466 |
| family | 11 | 0.171875 | 2.676981 |
| swimming | 12 | 0.1875 | 2.659012 |
| beer | 9 | 0.140625 | 2.636098 |
| love | 8 | 0.125 | 2.43417 |
| music | 32 | 0.5 | 1.701224 |

FIG. 4B

600a → Concept search: Glue, Tape ← 605a

| Word | PvOneAScore | PvOneBScore | PvTwoScore |
|---|---|---|---|
| tape | 1.0075 | 0.840487 | 0 |
| scotch tape | 1.0075 | 0.720731 | 0 |
| glue | 1.0075 | 0.650853 | 0 |
| epoxy resin | 1.0075 | 0.632926 | 0 |
| masking tape | 0.9525 | 0.652439 | 0 |
| screw | 0.77 | 0.513414 | 0 |
| pin | 0.77 | 0.481341 | 0 |
| rivet | 0.77 | 0.468292 | 0 |
| putty | 0.7625 | 0.530487 | 0 |
| wax | 0.7025 | 0.521951 | 0 |
| mortar | 0.6975 | 0.479268 | 0 |
| cable | 0.68 | 0.394756 | 0 |
| clamp | 0.67 | 0.404878 | 0 |
| bolt | 0.67 | 0.387804 | 0 |
| fuse | 0.65 | 0.435609 | 0 |
| pipe | 0.65 | 0.364634 | 0 |
| cement | 0.6475 | 0.45939 | 0 |
| pulley | 0.64 | 0.381707 | 0 |
| rope | 0.63 | 0.448414 | 0 |
| extension ladder | 0.63 | 0.357317 | 0 |
| safety pin | 0.62 | 0.463048 | 0 |
| staple | 0.62 | 0.454512 | 0 |
| nail | 0.62 | 0.395975 | 0 |
| plaster | 0.6025 | 0.549634 | 0 |

FIG. 6A

Google™

Sets

600b

Predicted Items

Tape

Glue

Scissors

Construction Paper

Markers

Cardboard

Crayons

String

Paint

Ruler

Pencils

Tissue paper

Paper

FIG. 6B

Concept search: Glue, Tape

600c → , 605c ←

| Word | PvOneAScore | PvOneBScore | PvTwoScore |
|---|---|---|---|
| screw | 0.980769 | 0.589473 | 0 |
| glue | 0.980769 | 0.58307 | 0 |
| epoxy resin | 0.980769 | 0.570175 | 0 |
| nail | 0.980769 | 0.56307 | 0 |
| rivet | 0.980769 | 0.545175 | 0 |
| bolt | 0.980769 | 0.471491 | 0 |
| mortar | 0.980769 | 0.468421 | 0 |
| tape | 0.953846 | 0.774473 | 0 |
| scotch tape | 0.953846 | 0.682456 | 0 |
| masking tape | 0.953846 | 0.614912 | 0 |
| clamp | 0.953846 | 0.475438 | 0 |
| pulley | 0.907692 | 0.421052 | 0 |
| pin | 0.903846 | 0.573157 | 0 |
| cement | 0.903846 | 0.436578 | 0 |
| magnet | 0.903846 | 0.392982 | 0 |
| putty | 0.765384 | 0.507894 | 0 |
| plaster | 0.75 | 0.506754 | 0 |
| cable | 0.738461 | 0.430614 | 0 |
| extension ladder | 0.738461 | 0.413596 | 0 |
| tar | 0.734615 | 0.375614 | 0 |
| fuse | 0.71923 | 0.46307 | 0 |
| pipe | 0.692307 | 0.38421 | 0 |
| faucet | 0.692307 | 0.381578 | 0 |
| plywood | 0.692307 | 0.348157 | 0 |
| thread | 0.688461 | 0.451754 | 0 |

Concept Input Form

Concept : door  805a synonyms: 810 portal
(Enter synonyms separated by comma)

[ back to search ] [ find related ] [ save ] [ delete ]

All Properties

| Property 815 | Value 820 | Select 825 | Description 830 |
|---|---|---|---|
| Origin | Organic Object | ☐ | *How is this object produced? What are its origins? *Organic Object: A living thing. This category does not include animate beings such as people and animals, but does include inanimated living things such as trees and flowers. *Inorganic Natural : Any object that is not living but was not made by humans, such as a rock, mountain or cloud. *Artifact: Any object made by humans, whether of organic materials such as wood, or inorganic such as stone, or synthetic. |
|  | Inorganic Natural | ☐ |  |
|  | Artifact | ☑ |  |
|  | Material | ☐ |  |
|  | Geographic | ☐ |  |
| Function | Encourage | ☐ | *What are the main uses of this object? What are its possible uses? *Make sure that you have a good reason for assigning any given use or function to the object to ensure the accuracy of this program. *If you are defining a naturally occurring object that was not made for a specific use, then put some uses that it may be used for. |
|  | Rejuvinate | ☐ |  |
|  | Threaten | ☐ |  |
|  | Attract People | ☐ |  |
|  | Challenge | ☐ |  |
|  | N/A | ☐ |  |

FIG. 8A

| | | | |
|---|---|---|---|
| Location Of Use | any/varies | ☐ | |
| | N/A | ☐ | *Where is this object generally used by people? *Mostly Indoors: Anything used inside a house, building or other edifice, which is not easily removed. This also includes things used for the actual building, so a window would be listed as indoors even though technically part of it would be facing outdoors. *Mostly Outdoors: Anything generally used outside of a building. *In/on body: These are items that are used on the body, either worn or carried in the hands, and they are not of any use when not on the body. They may, of course be removed from the body, physically, but they should not generally be of use when not touching the body in some way, such as a helmet. Anything put into the body, such as food, would also fall into this category. The main action should be done by the agent to himself only, so utensils, such as forks and knives would not fall into this category because they do something to another object. A knife can cut things and a fork moves them. |
| | any/varies | ☐ | |
| | mostly indoors | ☑ | |
| | mostly outdoors | ☐ | |
| | in/on water | ☐ | |
| | in sky | ☐ | |
| | in/on body | ☐ | |
| | On Feet | ☐ | |
| | On Legs | ☐ | |
| | On Torso | ☐ | |
| | On Hands | ☐ | |
| | On Arms | ☐ | |
| | On Neck | ☐ | |
| | On Head | ☐ | |
| Fixedness | N/A | ☐ | * Is the object attached to anything? Is the object to which it is attached, itself attached to anything or is it in motion? |
| | any/varies | ☐ | |
| | not fixed | ☐ | |
| | tied/plugged in | ☐ | |
| | fixed | ☑ | |

FIG. 8B

Concept Input Form

Concept : happy ~805c synonyms: 810 joyous (Enter synonyms separated by comma)

[back to search] [find related] [save] [delete]

All Properties

| Property 815 | Value 820 | Select 825 | Description 830 |
|---|---|---|---|
| Noun and Suffix | Yes | ☐ | |
| Participle/ Gerund | Yes | ☐ | |
| | does verb | ☐ | |
| | object of verb | ☐ | |
| Describes | Inanimate | ☐ | |
| | Animate | ☑ | |
| | Object bearing quality | ☐ | |
| | Subject's attitude to object | ☐ | |
| | Yes | ☐ | |
| Basic Category | Yes | ☐ | |

| | | |
|---|---|---|
| Togetherness | Apart | ☐ |
| | Together | ☐ |
| | Yes | ☐ |
| Love | Yes | ☐ |
| | hatred | ☐ |
| | Dislike | ☐ |
| | Indifference | ☐ |
| | Like | ☑ |
| | Love | ☐ |
| Admiration | Contempt | ☐ |
| | Ambivalent | ☐ |
| | Respect | ☐ |
| | Admiration/Worship | ☐ |
| | Yes | ☐ |
| Need | Yes | ☐ |
| | Repulsion | ☐ |
| | don't want | ☐ |
| | neutral | ☐ |
| | want | ☐ |

| | |
|---|---|
| Happiness | neutral |
| | want |
| | need |
| | Very Sad |
| | Morose |
| | Neutral |
| | Happy/Funny ☑ |
| | Blissful ☑ |
| | Yes ☑ |
| Sanity | Yes |
| | Crazy |
| | Strange |
| | Absurd |
| | Sane |
| | Logical |
| Fear | Fearless |
| | Brave |
| | Normal |
| | Shy/Timid |
| | Afraid |

FIG. 8E

| All Properties 915 | 920 | 925 930 | |
|---|---|---|---|
| Property | Value | Coefficient [reset values] | Description |
| Origin | Artifact | 1.00 | *How is the object produced? What are the origins? *Organic object: A living thing. This category does not include animate beings such as people and animals, but does include inanimated living things such as trees and flowers. *Inorganic Natural: Any object that is not living was not made by humans, such as a rock, mountain or cloud. *Artifact: Any object made by humans, whether of organic materials such as wood, or inorganic such as stone, or synthetic. |
| Function | support | 2.80 | *What are the the main users of this object? What are it's possible uses?* Make sure that you have a good reason for assigning any given use or function to the object to ensure the accuracy of this program. *If you are defining a naturally occurring object that was not made for a specific use, then put some uses that it may be used for. |
| | adorn | 2.80 | |
| | restore/heal | 2.80 | |
| | Rejuvenate | 1.00 | |
| Operation | spring | 1.30 | *How is the object operated, if at all? *Static: the object does not do anything itself, although it may of course still have a function, as a table. *Manual: The object has no internal source of power but rather to perform its function it must be wielded by a person, such as a hammer. |
| Location Of Use | mostly indoors | 1.20 | *Where is the object generally used by people? *Mostly indoors: Anything used inside a house, building or other edifice, which is not easily removed. This also includes things used for the actual building, so a window would be listed as indoors even though technically part of it would be facing outdoors. *Mostly outdoors: anything generally used outside of a building. *In/on body: these are items that are used on the body, either worn or carried in the hands, and they are not of any use when not on the body. They may, of course be removed from the body physically, but they should not generally be of use when not touching the body in some way, such as a helmet. Anything put into the body, such as food, would also fall into this category. The main action should be done by the agent to himself only, so utensils such as forks and knifes would not fall into this category because they do something to another object. A knife can cut things and a fork moves them. |
| Fixedness | not fixed | 1.00 | *Is the object attached to anything? Is the object to which it is attached, itself a attached to anything or is it in motion? |
| Phase | solid | 1.00 | *If the object has various components, some of which are solid in some of which are liquid, then select partly or |

FIG. 9

Save up to 40% with Thailand Tours
Our escorted Thailand tours will save you up to 40% off the price of traveling the same itinerary on your own. Register at our easy Web site for all tour discounts and deals.
www.tourvactionstogo.com

Discount Hotel Rates Worldwide
Find discounts on travel destinations with Best Hotels Network. View photos and maps, and book instantly. Best Hotels Network has been providing the lowest hotel rates for over 10 years.
www.besthotelsnetwork.com > I've checked them, please show me more results Place your VacationAds ™ Ad here! Find out how...

Brands Matching Your Search > buddhism > thailand          Searched 8,000 Vacations

| Thailand Hotels | Thailand Family Resort |
| Thailand Tour Packages | Thailand Travel Packages |
| Thailand Travel Guide | Thailand Vacation Tour — 1635 |
| Thailand Hotels, Packages & Tours | Smithonian Tour to Thailand |

Brands in Category > thailand Vacations

| Adult Adventure Tour in Thailand | Live aboard & Scuba Diving in Thailand |
| Smithonian Tour in Thailand | Thailand Family Resort |
| Thailand Hotels | Thailand Hotels, Packages & Tours |
| Thailand Tour Packages | Thailand Travel Guide |
| Thailand Travel Packages | Thailand Vacation Tour |

Golf Resorts
Health Spas
Hostels
Hotel Chains
Hotel Reservations
Hotels
Inns
Las Vegas Hotels
Lodges
Motels
New York Hotels
Resorts
San Francisco Hotels
Ski Resorts
Tennis Resorts
Timeshares
Vacation Homes
Vacation Rentals
Villas
▶ Africa
   More Africa...
▶ Asia
   More Asia...

FIG. 16B-2

Sponsor Links

Travel Chess
Folding stools, Wooden carved partitions, Antiques, Wooden boxes, Chess sets, Chess pieces, Bowls, Traveling chess, magnetic chess, solitaire, wooden games,..
www.woodengames.net

Lights Out Candles-Travel Candles
We carry two different sizes of travel candles, both in convenient tins. Our travel candles come in many scents: eucalyptus, espresso, chocolate martini, vanilla mint and more. —1630
www.lightsoutcandles.com

Buy Quality Yoga Travel Bags
AgoyUSA offers a range of stylish yoga products such as yoga mats, yoga bags and yoga accessories. We also offer an extensive range of relaxing yoga retreats. Contact us for more details.
www.agoyusa.com > I've checked them, please show me more results

[ Search AlltheVacations ]

[ thailand ]

About Us | FAQ | Contact Us | Bookmark Us | Advertise With Us
VacationAds Client Center ©2006 AlltheVacations.com
Brand names are trademarks of their owner.

- Australasia
  More Australasia...
- Caribbean
  More Caribbean...
- Central America
  More Central America...
- Eastern Europe
  More Eastern Europe...
- Middle East
  More Middle East...
- North America
  More North America...
- South America
  More South America...
- Western Europe

RECOMMENDATION SYSTEMS AND METHODS USING INTEREST CORRELATION

RELATED APPLICATION

This application is a continuation of U.S. application Ser. No. 11/807,191, filed May 25, 2007 now U.S. Pat. No. 7,734, 641, which is related to U.S. application Ser. No. 11/807,218, filed May 25, 2007, now abandoned. The entire teachings of the above applications are incorporated herein by reference.

BACKGROUND

At times, it can be difficult for an online user to shop for products or find an appropriate product or service online. This is especially true when the user does not know exactly what he or she is looking for. Consumers, for example, expect to be able to input minimal information as search criteria and, in response, get specific, targeted and relevant information. The ability to consistently match a product or service to a consumer's request for a recommendation is a very valuable tool, as it can result in a high volume of sales for a particular product or company. Unfortunately, effectively accommodating these demands using existing search and recommendation technologies requires substantial time and resources, which are not easily captured into a search engine or recommendation system. The difficulties of this process are compounded by the unique challenges that online stores and advertisers face to make products and services known to consumers in this dynamic online environment.

Recommendation technology exists that attempts to predict items, such as movies, music and books that a user may be interested in, usually based on some information about the user's profile. Often, this is implemented as a collaborative filtering algorithm. Collaborative filtering algorithms typically analyze the user's past behavior in conjunction with the other users of the system. Ratings for products are collected from all users forming a collaborative set of related "interests" (e.g., "users that liked this item, have also like this other one"). In addition, a user's personal set of ratings allows for statistical comparison to a collaborative set and the formation of suggestions. Collaborative filtering is the recommendation system technology that is most common in current e-commerce systems. It is used in several vendor applications and online stores, such as Amazon.com.

Unfortunately, recommendation systems that use collaborative filtering are dependent on quality ratings, which are difficult to obtain because only a small set of users of the e-commerce system take the time to accurately rate products. Further, click-stream and buying behavior as ratings are often not connected to interests because the user navigation pattern through the e-commerce portal will not always be a precise indication of the user buying preferences. Additionally, a critical mass is difficult to achieve because collaborative rating relies on a large number of users for meaningful results, and achieving a critical mass limits the usefulness and applicability of these systems to a few vendors. Moreover, new users and new items require time to build history, and the statistical comparison of items relies on user ratings of previous selections. Furthermore, there is limited exposure of the "long tail," such that the limitation on the growth of human-generated ratings limits the number of products that can be offered and have their popularity measured.

The long tail is a common representation of measurements of past consumer behavior. The theory of the long tail is that economy is increasingly shifting away from a focus on a relatively small number of "hits" (e.g., mainstream products and markets) at the head of the demand curve and toward a huge number of niches in the tail. FIG. 1 is a graph illustrating an example of the long tail phenomenon showing the measurement of past demand for songs, which are ranked by popularity on the horizontal axis. As illustrated in FIG. 1, the most popular songs 120 are made available at brick-and-mortar (B&M) stores and online while the least popular songs 130 are made available only online.

To compound problems, most traditional e-commerce systems make overspecialized recommendations. For instance, if the system has determined the user's preference for books, the system will not be capable of determining the user's preference for songs without obtaining additional data and having a profile extended, thereby constraining the recommendation capability of the system to just a few types of products and services.

There are rule-based recommendation systems that rely on user input and a set of pre-determined rules which are processed to generate output recommendations to users. A web portal, for example, gathers input to the recommendation system that focuses on user profile information (e.g., basic demographics and expressed category interests). The user input feeds into an inference engine that will use the pre-determined rules to generate recommendations that are output to the user. This is one simple form of recommendation systems, and it is typically found in direct marketing practices and vendor applications.

However, it is limited in that it requires a significant amount of work to manage rules and offers (e.g., the administrative overhead to maintain and expand the set of rules can be considerably large for e-commerce systems). Further, there is a limited number of pre-determined rules (e.g., the system is only as effective as its set of rules). Moreover, it is not scalable to large and dynamic e-commerce systems. Finally, there is limited exposure of the long tail (e.g., the limitation on the growth of a human-generated set of inference rules limits the number of products that can be offered and have their popularity measured).

Content-based recommendation systems exist that analyze content of past user selections to make new suggestions that are similar to the ones previously selected (e.g., "if you liked that article, you will also like this one"). This technology is based on the analysis of keywords present in the text to create a profile for each of the documents. Once the user rates one particular document, the system will understand that the user is interested in articles that have a similar profile. The recommendation is created by statistically relating the user interests to the other articles present in a set. Content-based systems have limited applicability, as they rely on a history being built from the user's previous accesses and interests. They are typically used in enterprise discovery systems and in news article suggestions.

In general, content-based recommendation systems are limited because they suffer from low degrees of effectiveness when applied beyond text documents because the analysis performed relies on a set of keywords extracted from textual content. Further, the system yields overspecialized recommendations as it builds an overspecialized profile based on history. If, for example, a user has a user profile for technology articles, the system will be unable to make recommendations that are disconnected from this area (e.g., poetry). Further, new users require time to build history because the statistical comparison of documents relies on user ratings of previous selections.

SUMMARY

In today's dynamic online environment, the critical nature of speed and accuracy in information retrieval can mean the difference between success and failure for a new product or service, or even a new company. Consumers want easy and quick access to specific, targeted and relevant recommendations. The current information gathering and retrieval schemes are unable to efficiently provide a user with such targeted information. Nor are they able to accommodate the versatile search queries that a user may have.

Thus, one of the most complicated aspects of developing an information gathering and retrieval model is finding a scheme in which the cost-benefit analysis accommodates all participants, i.e., the users, the online stores, and the developers (e.g., search engine providers). The currently available schemes do not provide a user-friendly, developer-friendly and financially-effective solution to provide easy and quick access to quality recommendations.

Computer implemented systems and methods for recommending products and services are provided by the present invention. Online information, such as user profiles, are processed to extract keywords. Multiple user profiles are correlated based on interests and product references in the profiles. Keywords, for example, that commonly appear together in user profiles can be identified. A search query is received from, for example, a search engine. The search query may be initiated by a user who is shopping online for a product or service. The search query may be a request for a gift recommendation or a trip recommendation. When the search query is processed, it is expanded with additional search terms related to the search query. The search query is expanded using one or more of the identified co-occurring keywords from the processed user profiles.

When identifying the co-occurring keywords from the user profiles, the frequency with which a keyword appears in conjunction with another keyword is computed in the overall defined population. The degree to which the two keywords tend to occur together can be computed. A ratio indicating the frequency with which the two keywords occur together is determined. A correlation index indicating the likelihood that users interested in one of the keywords will also be interested in the other keyword is determined. The computed degree, the determined ratio and the correlation index can be processed to determine a percentage of co-occurrence for each keyword. The percentage of co-occurrence for each keyword is used to determine a correlation ratio, which indicates how often a co-occurring keyword is present when another co-occurring keyword is present, as compared to how often it occurs on its own. This information is used in processing keywords in queries to identify matching keywords. The matching keywords can be used to search products, services or internet sites to generate recommendations.

The user profiles can be processed to extract keywords using a web crawler. User profiles, such as personal profiles on myspace.com or friendster.com on the Internet can be analyzed. Keywords can be extracted from the analyzed user profiles.

Term frequency-inverse-document frequency (tf-idf) weighing measures can be used to determine how important an identified keyword is to a subject profile in a collection or corpus of profiles. The importance of the identified keyword can increase proportionally to the number of times it appears in the document, offset by the frequency the identified keyword occurs in the corpus. The tf-idf calculation can be used to determine the weight of the identified keyword (or node) based on its frequency, and it can be used for filtering in/out other identified keywords based on their overall frequency. The tf-idf scoring can be used to determine the value of the identified keyword as an indication of user interest. The tf-idf scoring can employ the topic vector space model (TVSM) to produce relevancy vector space of related keywords/interests.

Each identified keyword can be used to generate an output node and a super node. The output nodes are normally distributed close nodes around each token of the original query. The super nodes act as classifiers identified by deduction of their overall frequency in the corpus. A super node, for example, would be "rock music" or "hair bands." However, if the idf value of an identified keyword is below zero, then it is determined not to be a super node. A keyword like "music," for example is not considered a super node (classifier) because its idf value is below zero, in that it is too popular or broad to yield any indication of user interest.

A software system is implemented for recommending products and services. The software system includes a web crawler that processes user profiles to extract keywords. A handler, in communication with the web crawler, receives keywords that have been identified as occurring together in the same user profiles. A recommendation engine can be provided to expand a given search query with additional search terms related to the search query, as determined by the correlation ratio. The additional search terms are determined using one or more of the identified co-occurring keywords.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1 is a graph illustrating the Long Tail phenomenon, with products available at brick-and-mortar and online arms of a retailer.

FIGS. 3C-3D are screenshots of typical personal profile pages.

FIGS. 4A-4B are tables illustrating search results according to an aspect of the present invention.

FIGS. 6A and 6C are tables illustrating search results based on the Concept Specific Ontology according to an aspect of the present invention.

FIGS. 6B and 6D are tables illustrating search results based on prior art technologies.

FIGS. 8A-8E are diagrams illustrating the Concept Input Form of the Concept Specific Ontology according to an aspect of the present invention.

FIG. 9 is a diagram illustrating the Settings page used to adjust the weighting of each property value of a concept of the Concept Specific Ontology according to an aspect of the present invention.

FIGS. 12A-19 are diagrams illustrating example applications of the connection of external web services of FIG. 11 to the recommendation system (Interest Analysis Engine) according to an aspect of the present invention.

DETAILED DESCRIPTION OF THE INVENTION

A description of example embodiments of the invention follows.

Figure 2A:
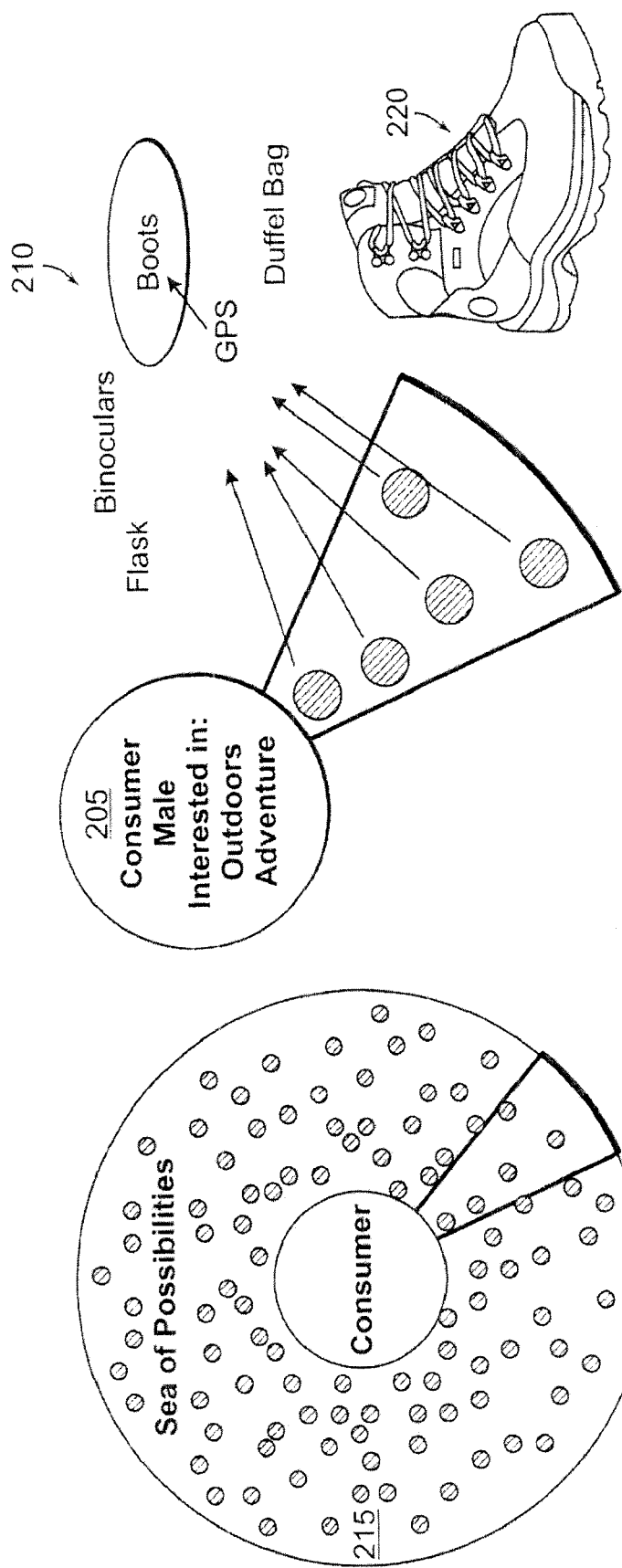
FIG. 2A is a diagram illustrating an example method of gift recommendation according to an aspect of the present invention.
Figure 2B:
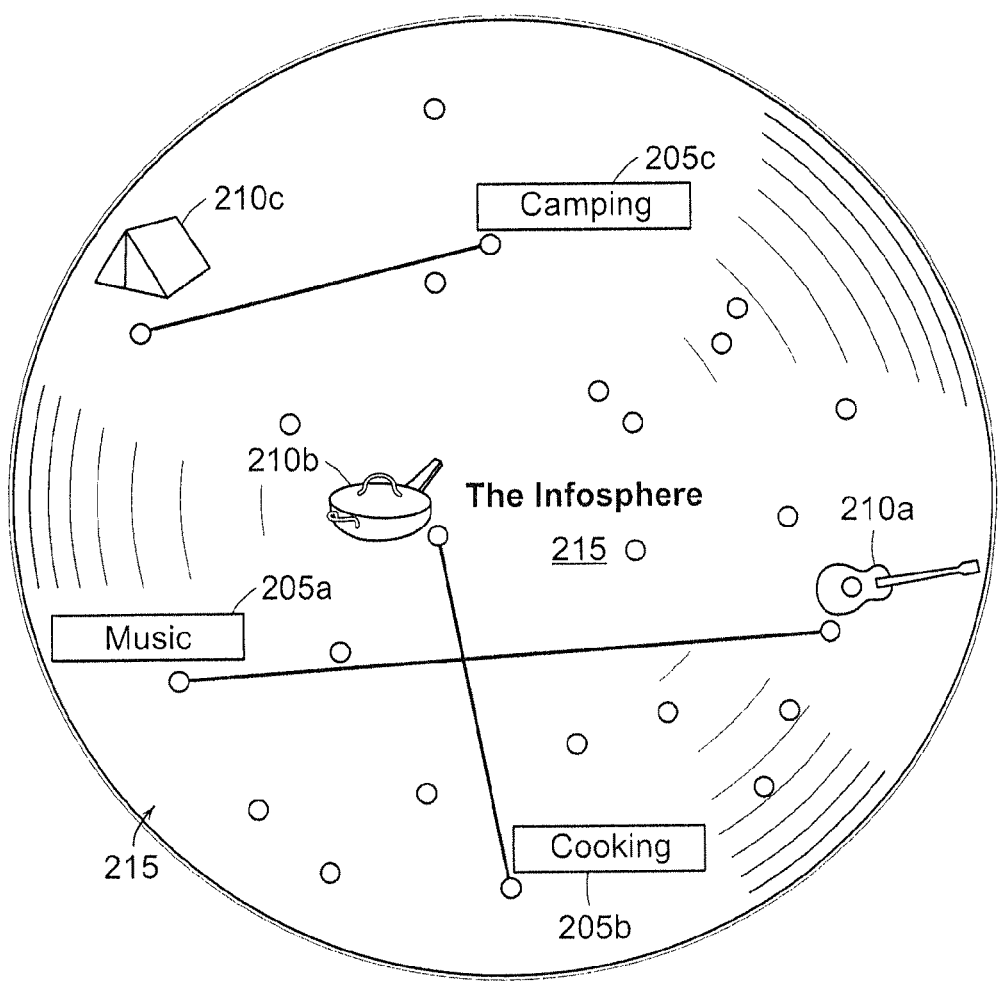
FIG. 2B is a diagram illustrating the relationship between interests and buying behavior.

The search technology of the present invention is sensitive to the semantic content of words and lets the searcher briefly describe the intended recipient (e.g., interests, eccentricities, previously successful gifts). As illustrated in FIG. 2A, these terms 205 may be descriptors such as Male, Outdoors and Adventure. Based on that input 205, the recommendation software of the present invention may employ the meaning of the entered terms 205 to creatively discover connections to gift recommendations 210 from the vast array of possibilities 215, referred to herein as the infosphere. The user may then make a selection 220 from these recommendations 210. The engine allows the user to find gifts through connections that are not limited to information previously available on the Internet, connections that may be implicit. Thus, as illustrated in FIG. 2B, interests can be connected to buying behavior by relating terms 205a-205c to respective items 210a-210c.

Figure 3A:
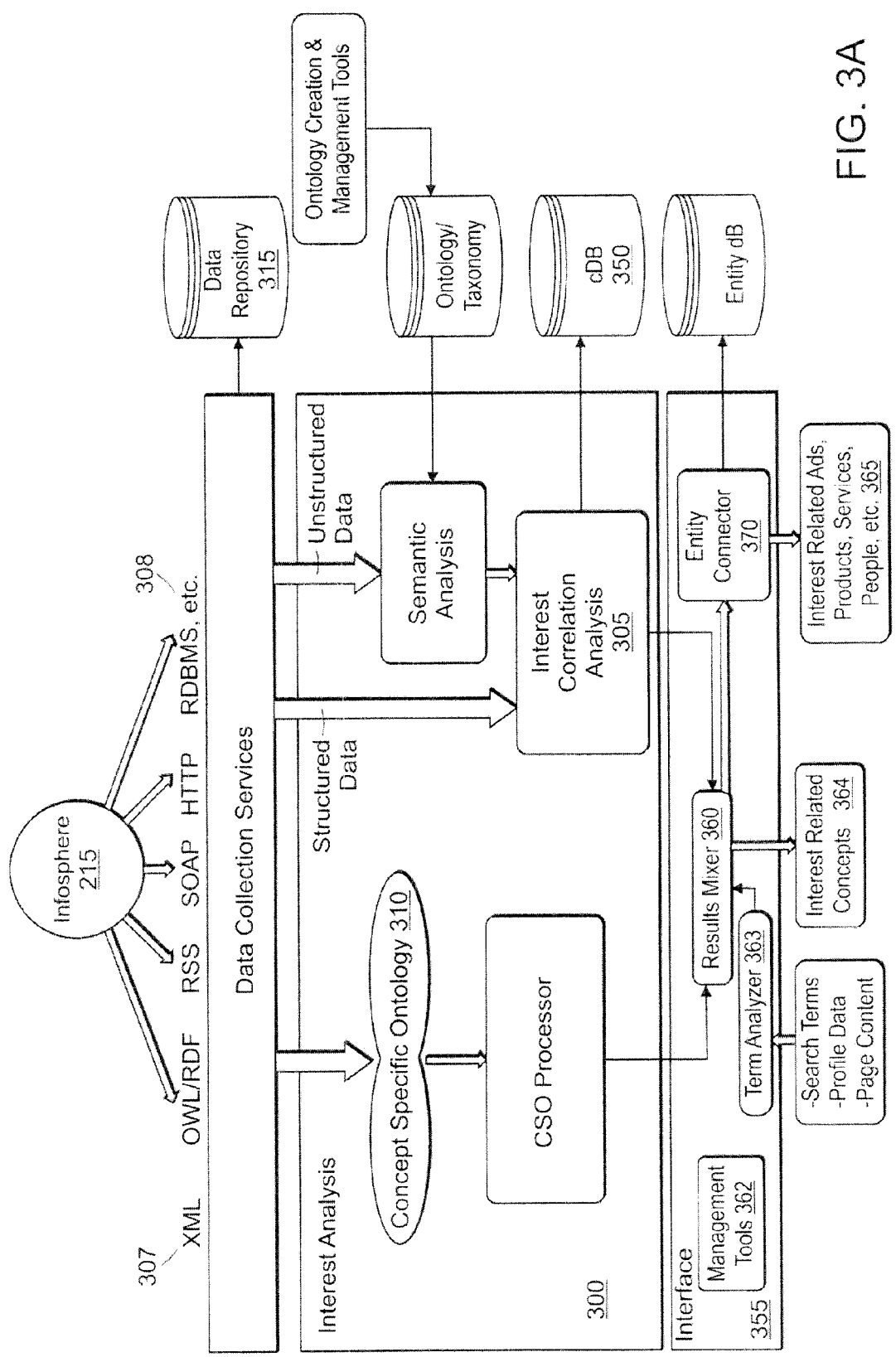
FIG. 3A is a diagram of the recommendation system (Interest Analysis Engine) according to an aspect of the present invention.

While taking advantage of the results provided by statistical methods of recommendation, example embodiments of the present invention perform an analysis of the meaning of user data to achieve better results. In support of this approach, the architecture of the recommendation system 300, which is also referred to herein as the Interest Analysis Engine (IAE), as illustrated in FIG. 3A, is centered on the combination of the results of two components. The first component is referred to herein as Interest Correlation Analysis (ICA) engine 305 and, in general, it is an algorithm that focuses on the statistical analysis of terms and their relationships that are found in multiple sources on the Internet (a global computer network). The second component is referred to herein as Concept Specific Ontology (CSO) 310 and, in general, it is an algorithm that focuses on the understanding of the meaning of user provided data.

Preferably, the recommendation system 300 includes a web-based interface that prompts a user to input a word or string of words, such as interests, age, religion or other words describing a person. These words are processed by the ICA engine 305 and/or the CSO 310 which returns a list of related words. These words include hobbies, sports, musical groups, movies, television shows, food and other events, processes, products and services that are likely to be of interest to the person described through the inputted words. The words and related user data are stored in the database 350 for example.

The ICA engine 305 suggests concepts that a person with certain given interests and characteristics would be interested in, based upon statistical analysis of millions of other people. In other words, the system 300 says "If you are interested in A, then, based upon statistical analysis of many other people who are also interested in A, you will probably also be interested in B, C and D."

In general, traditional search technologies simply fail their users because they are unable to take advantage of relations between concepts that are spelled differently but related by the properties of what they denote. The CSO processor 310 uses a database that builds in "closeness" relations based on these properties. Search algorithms then compare concepts in many ways returning more relevant results and filtering out those that are less relevant. This renders information more useful than ever before.

The search technology 300 of the present invention is non-hierarchical and surpasses existing search capabilities by placing each word in a fine-grained semantic space that captures the relations between concepts. Concepts in this dynamic, updateable database are related to every other concept. In particular, concepts are related on the basis of the properties of the objects they refer to, thereby capturing the most subtle relations between concepts. This allows the search technology 300 of the present invention to seek out concepts that are "close" to each other, either in general, or along one or more of the dimensions of comparison. The user, such as the administrator, may choose which dimension(s) is (are) most pertinent and search for concepts that are related along those lines.

In one preferred embodiment, the referent of any word can be described by its properties rather than using that word itself. This is the real content or "meaning" of the word. In principle, any word can be put into a semantic space that reflects its relationship to other words not through a hierarchy of sets, but rather through the degree of shared qualities between referents of the words. These related concepts are neither synonyms, homonyms, holonyms nor meronyms. They are nonetheless similar in various ways that CSO 310 is able to highlight. The search architecture of the present invention therefore allows the user to execute searches based on the deep structure of the meaning of the word.

As illustrated in FIG. 3A, the ICA engine 305 and the CSO 310 are complementary technologies that can work together to create the recommendation system 300 of the present invention. The statistical analysis of the ICA engine 305 of literal expressions of interest found in the infosphere 215 creates explicit connections across a vast pool of entities. The ontological analysis of CSO 310 creates conceptual connections between interests and can make novel discoveries through its search extension.

Interest Correlation Analyzer

The Internet, or infosphere 215, offers a massive pool of actual consumer interest patterns. The commercial relevance of these interests is that they are often connected to consumers' buying behavior. As part of the method to connect interests to products, this information can be extracted from the Internet, or the infosphere 215, by numerous protocols 307 and sources 308, and stored in a data repository 315. The challenge is to create a system that has the ability to retrieve and analyze millions of profiles and to correlate a huge number of words that may be on the order of hundreds of millions.

Referring to FIGS. 3A, 4A and 4B, the recommendation system 300 functions by extracting keywords 410a, b retrieved from the infosphere 215 and stored in the data repository 315. An example output of the ICA engine 305 is provided in the table in FIG. 4A. Search terms 405a processed through the ICA engine 305 return numerous keywords 410a that are accompanied by numbers 415 which represent the degree to which they tend to occur together in a large corpus of data culled from the infosphere 215. In the example, the search term 405a "nature" appears 3573 times in the infosphere 215 locations investigated. The statistical analysis also reveals that the word "ecology" appears 27 times in conjunction with the word "nature."

The R-Factor column 420 indicates the ratio between the frequency 415 of the two terms occur together and the frequency 415 of one term (i.e., 27 occurrences of "ecology" and "nature" divided by 3573 occurrences of "nature"=0.007556675). The correlation index 425 indicates the likelihood that people interested in "nature" will also be interested in "ecology" (i.e., the strength of the relationship between the search term 405a and the keyword 410) compared to the average user. The calculation of this correlation factor 425 was determined through experimentation and further detail below. In this particular case, the analysis output by the algorithm indicates that people interested in "nature" will be approximately 33.46 times more likely to be interested in "ecology" than the average person in society.

There are two main stages involved in the construction and use of the ICA engine 305: database construction and population, and data processing.

How the ICA Works

The ICA engine 305 employs several methods of statistically analyzing keywords. For instance, term frequency-inverse document frequency (tf-idf) weighting measures how important a word is to a document in a collection or corpus, with the importance increasing proportionally to the number of times a word appears in the document offset by the frequency of the word in the corpus. The ICA engine 305 uses tf-idf to determine the weights of a word (or node) based on its frequency and is used primarily for filtering in/out keywords based on their overall frequency and the path frequency.

The ICA then, using the tf-idf scoring method, employs the topic vector space model (TVSM), as described in Becker, J. and Kuropka, D., "Topic-based Vector Space Model," Proceedings of BIS 2003, to produce relevancy vector space of related keywords/interests. The ICA also relies on the Shuffled Complex Evolution Algorithm, described in Y. Tang, P. Reed, and T. Wagener, "How effective and efficient are multiobjective evolutionary algorithms at hydrologic model calibration?," Hydrol. Earth Syst. Sci., 10, 289-307, 2006, J. Li, X. Li, C. M. Frayn, P. Tino and X. Yao, "Understanding and Predicting Dynamical Behaviours in Financial Markets: Financial Application Research in CERCIA," 10th Annual Workshop on Economic Heterogeneous Interacting Agents (WEHIA 2005), University of Essex, UK, June 2005, Phillip Jordan1, 2, Alan Seed3, Peter May 3 and Tom Keenan3, "Evaluation of dual polarization radar for rainfall-runoff modelling: a case study in Sydney, Australia," Sixth International Symposium on Hydrological Applications of Weather Radar, 2004, Juan Liu Iba, H., Selecting Informative Genes Using a Multiobjective Evolutionary Algorithm, Proceedings of the 2002 Congress on Evolutionary Computation, 2002. All the above documents relating to tf-idf, TVSM and Shuffled Complex Evolution are incorporated herein by reference.

1—Query

Figure 3B:
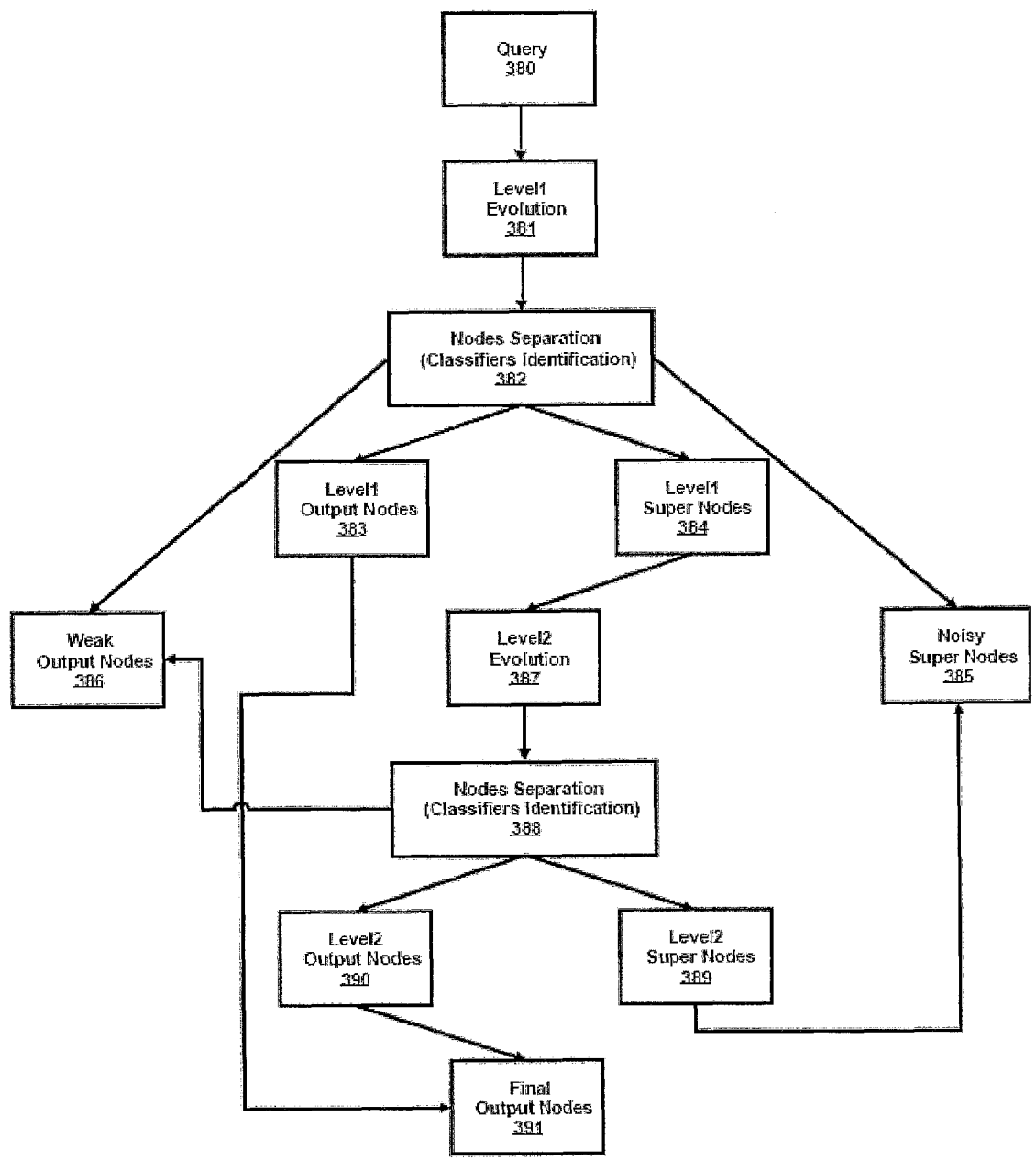
FIG. 3B is a flow chart illustrating the keyword weighting analysis of the Interest Correlation Analyzer according to an embodiment of the present invention.

FIG. 3B is a flow chart illustrating the keyword weighting analysis of the ICA 305. First, an input query 380 is broken down into lexical segments (i.e., keywords) and any annotation or "dummy" keywords are discarded.

2—Level 1 Evolution

In the Level 1 evolution 381, each keyword is fed into the first evolution separator 382 to generate two sets of nodes: output nodes 383 and super nodes 384. These two types of nodes are produced by the Shuffled Complex Evolution Algorithm. The output nodes 383 are normally distributed close nodes around each token of the original query. The super nodes 384 act as classifiers identified by deduction of their overall frequency in the corpus. For example, let us assume a user likes the bands Nirvana, Guns 'n' Roses, Pearl Jam and The Strokes. These keywords are considered normal nodes. Other normal nodes the ICA would produce are, for example, "drums," "guitar," "song writing," "Pink Floyd," etc. A deducted super node 384, for example, would be "rock music" or "hair bands." However, a keyword like "music," for example, is not considered a super node 384 (classifier) because its idf value is below zero, meaning it is too popular or broad to yield any indication of user interest.

The algorithm uses tf-idf for the attenuation factor of each node. This factor identifies the noisy super nodes 385 as well as weak nodes 386. The set of super nodes 384 is one to two percent of the keywords in the corpus and is identified by their normalized scores given their idf value greater than zero. The idf values for the super nodes 384 are calculated using the mean value of the frequency in the corpus and an arbitrary sigma ($\sigma$) factor of six to ten. This generates a set of about five hundred super nodes 384 in a corpus of sixty thousand keywords.

In this stage, the ICA 305 also calculates the weight of the node according to the following formula:

$$W(Qi \rightarrow Nj) = RP(i \rightarrow j)/\text{MeanPathWeight}(i \rightarrow j) * idf \quad \text{Equation 1}$$

where:
 Qi: query keyword (i)
 Nj: related node
 RP: Relative path weight (leads from Qi to Nj)
 MeanPathWeight: the mean path weight between Qi and all nodes Nx.

Idf calculates according to the following formula:

$$Idf(Nj) = \text{Log}((M+k*\text{STD})/Fj) \quad \text{Equation 2}$$

where:
 M: mean frequency of the corpus
 k: threshold of $\sigma$
 STD: standard deviation ($\sigma$)
 Fj: Frequency of the keyword Nj For a keyword Qi, ICA 305 must determine all the nodes connected to Qi. For example, there may be one thousand nodes. Each node is connected to Qi with a weight (or frequency). This weight represents how many profiles (people) assumed Qi and the node simultaneously. The mean frequency, M, of Qi in the corpus of nodes is calculated. For each node Nj we calculate the weight of the path, RP, from Qi to Nj by dividing the frequency of Qi in Nj by M. The ICA 305 then calculates the cdf/erfc value of this node's frequency for sampling error correction.

Any node with a score less than zero (negative weight) is classified as classifier super node. The weight for the super nodes are then recalculated as follows:

$$WS(i \rightarrow j) = RP(i \rightarrow j) * cdf(i \rightarrow j) \quad \text{Equation 3}$$

where:
 RP: relative path weight
 cdf: cumulative distribution function of Qi$\rightarrow$Nj
 erfc: error function (also called the Gauss error function).

The erfc error function is discussed in detail in Milton Abramowitz and Irene A. Stegun, eds. "Handbook of Mathematical Functions with Formulas, Graphs, and Mathematical Tables," New York: Dover, 1972 (Chapter 7), the teachings of which are incorporated herein by reference.

The weights of the output nodes 383 and the super nodes 384 are then normalized using z-score normalization, guaranteeing that all scores are between zero and one and are normally distributed. The mean (M) and standard deviation (STDV) of the output nodes 383 weights are calculated, with the weight for each node recalculated as follows:

$$W = X*\sigma - k*\sigma + \mu.$$  Equation 4 where:
X: new weight
k: threshold of negligent
μ: the mean (or average) of the relevancy frequency.
3—Level 2 Evolution The Level 1 super nodes 384 are then fed (with their respective weights) into Level 2 evolution 387. After being fed through a second evolution separator 388, the Level 2 evolution super nodes 389 are then discarded as noisy super nodes 385. Separator 388 also discards some nodes as weak output nodes 386. Each output node's 390 weight is calculated the same way as above and multiplied by the weight of its relative Level 1 super node 384.

4—Weight Combination

This is repeated for each keyword and the combination of keywords to yield sets of nodes and super nodes. The final node set 391 is an addition process of the Level 1 output nodes 383 and the Level 2 output nodes 390.

Database Construction and Population

Referring back to FIG. 3A, the main architecture of the ICA engine 305 consists of a computerized database (such as Microsoft Access or SQL server enterprise edition) 350 that is organized into two tables.

Table 1 has three fields:
A=UserID
B=Keyword
C=Class

Figure 3D:
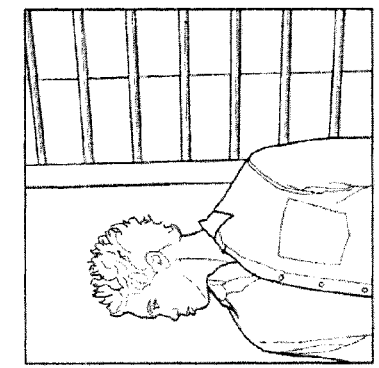

Table 2 has four fields which are populated after Table 1 has been filled:
A=Keyword
B=Class
C=Occurrence
D=Popularity Table 1 is populated with keywords culled from the infosphere 215, such as personal profiles built by individual human users that may be on publicly available Internet sites. Millions of people have built personal websites hosted on hundreds of Dating Sites and "Social Networking" Sites. These personal websites often list the interests of the creator. Examples of such sites can be found at www.myspace.com, www.hotornot.com, www.friendster.com, www.facebook.com, and many other places. For example, FIG. 3C depicts a typical dating site profile 392 showing the keywords that are used in the correlation calculations 393. FIG. 3D depicts a typical social networking profile 394 including interests, music, movies, etc. that are used in the correlation calculations 395.

The ICA engine 305 uses commercially available web parsers 307 and scrapers to download the interests found on these sites in the infosphere 215 into Table 1, Field B. Each interest, or keyword Table 1, Field B, is associated with the UserID acquired from the source website in the infosphere 215, which is placed into Table 1, Field A. If possible, an associated Class is entered into Field C from the source website in the infosphere 215. One record in Table 1 therefore consists of a word or phrase (Keyword) in Field B, the UserID associated with that entry in Field A, and an associated Class, if possible, in Field C. Therefore, three parsed social networking profiles from the infosphere 215 placed in Table 1 might look like the following:

TABLE 1

| UserID | Keyword | Class |
|--------|---------|-------|
| 5477 | The Beatles | Music |
| 5477 | Painting | Hobby |
| 5477 | CSI | Television |
| 5477 | 24 | Age |
| 6833 | Sushi | Food |
| 6833 | Canada | Place |
| 6833 | Romance | Relationships |
| 6833 | In College | Education |
| 6833 | CSI | Television |
| 8445 | 24 | Television |
| 8445 | Reading | Hobby |

In a preferred embodiment, millions of such records will be created. The more records there are, the better the system will operate.

Once this process is determined to be complete, Table 2 (in database 350) is constructed in the following manner. An SQL query is used to isolate all of the unique keyword and class combinations in Table 1, and these are placed in Field A (Keyword) and Field B (Class) respectively in Table 2. Table 2, Field C (Occurrence) is then populated by using an SQL query that counts the frequency with which each Keyword and Class combination occurs in Table 1. In the above example, each record would score 1 except CSI/Television which would score 2 in Table 2, Field C.

Table 2, Field D (Popularity) is populated by dividing the number in Table 2, Field C by the total number of unique records in Table 1, Field A. Therefore in the above example, the denominator would be 3, so that Table 2, Field D represents the proportion of unique UserIDs that have the associated Keyword and Class combination. A score of 1 means that the Keyword is present in all UserIDs and 0.5 means it is present in half of the unique UserIDs (which represents individual profiles scraped from the Internet). Therefore, Table 2 for the three parsed social networking profiles placed in Table 1 might look like the following:

TABLE 2

| Keyword | Class | Occurrence | Popularity |
|---------|-------|------------|------------|
| The Beatles | Music | 1 | 0.33333 |
| Painting | Hobby | 1 | 0.33333 |
| 24 | Age | 1 | 0.33333 |
| Sushi | Food | 1 | 0.33333 |
| Canada | Place | 1 | 0.33333 |
| Romance | Relationships | 1 | 0.33333 |
| In College | Education | 1 | 0.33333 |
| CSI | Television | 2 | 0.66666 |
| 24 | Television | 1 | 0.33333 |
| Reading | Hobby | 1 | 0.33333 |

Data Processing

A web-based interface, as illustrated in FIGS. 4A and 4B, created using C# or a similar programming language, may provide a text-box 401 for a user to enter search words that he or she would like to process on the ICA engine 305. A "Search" button 402 is then placed next to the text box to direct the interface to have the search request processed.

When a word or group of words 405a, b is entered in the text box 401 and "search" 402 is clicked, the following steps are taken. All of the UserIDs from Table 1 that contain that Keyword 405a, b are found and counted. A table, shown below in Table 3, is then dynamically produced of all the co-occurring words 410 in those profiles with the number of occurrences of each one 415. This number 415 is then divided by the total number of unique UserIDs that include the entered word to give a percentage of co-occurrence 420.

The percentage of co-occurrence 420 is then divided by the value in Table 2, Field D (Popularity) of each co-occurring word 410 to yield a correlation ratio 425 indicating how much more or less common the co-occurring word 410 is when the entered word 405 is present. This correlation ratio 425 is used to order the resulting list of co-occurring words 410 which is presented to the user. As illustrated in FIG. 4B, when multiple words 405b are entered by the user, only profiles containing all the entered words 405b would be counted 415, but otherwise the process would be the same. The list of results can be further filtered using the Class field to show only resulting words from Classes of interest to the user. A final results table when the word "Fashion" is entered might look like this:

TABLE 3

| Co-occurring Word | Occurrence | Local Popularity | Correlation |
| --- | --- | --- | --- |
| Fashion | 3929 | 1.0000 | |
| Project runway | 10 | 0.0025 | 23.2 |
| Cosmetics | 15 | 0.0038 | 22.7 |
| Vogue | 8 | 0.0020 | 22.5 |

Concept Specific Ontology

Preferably, the main goal behind the CSO approach 310 is the representation of the semantic content of the terms without a need for user feedback or consumer profiling, as in the prior art. As such, the system 300, 310 is able to function without any statistical investigation. Instead, the user data is analyzed and correlated according to its meaning.

Figure 5:
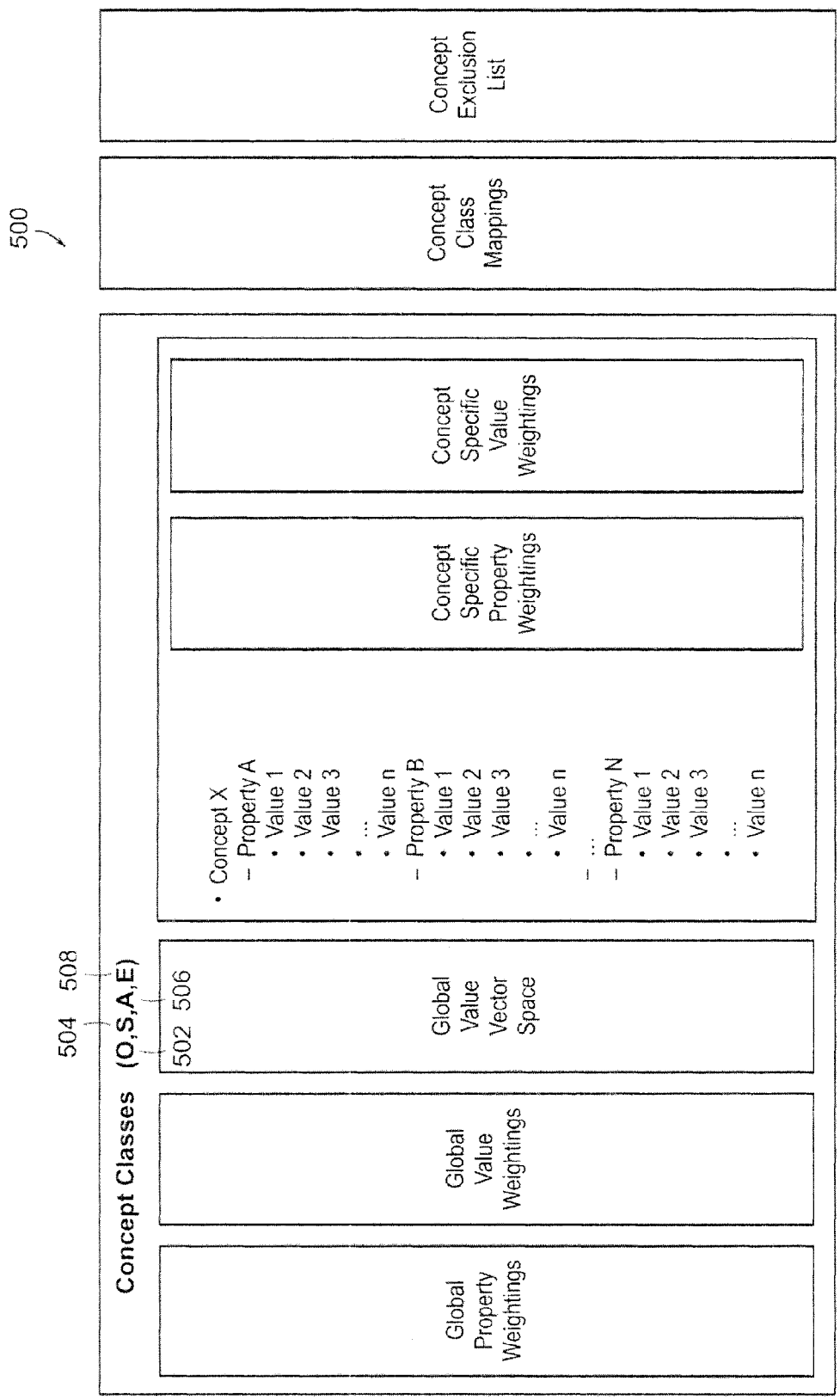
FIG. 5 is a diagram of the semantic map of the Concept Specific Ontology of the present invention.

Unlike traditional search technology, the present invention's CSO semantic map 500, as illustrated in FIG. 5, enables fine-grained searches that are determined by the user's needs. CSO search technology 310 therefore offers the help of nuanced and directed comparisons by searching the semantic space for relations between concepts. In short, the present invention's CSO 310 provides a richly structured search space and a search engine of unprecedented precision.

Concepts

Concepts are the core of the CSO 310. A concept is a term (one or more words) with content, of which the CSO 310 has knowledge. Concepts are put into different classes. The classes can be, for example, objects 502, states 504, animates 506 and events 508. A concept can exist in one or more class. The following is an example of four concepts in the CSO 310 along with the respective class:

TABLE 4

| Concept | Class |
| --- | --- |
| run | event |
| accountant | animate |
| airplane | object |
| happy | state |

It should be noted that although example classes, objects 502, states 504, animates 506 and events 50, are discussed as an example implementation, according to another embodiment the recommendation system 300 can classify in other ways, such as by using traditional, hierarchical classes.

While traditional taxonomy can classify terms using a hierarchy according to their meaning, it is very limited with regard to the relationships they can represent (e.g., parent-child, siblings). Conversely, the present invention's ontological analysis classifies terms in multiple dimensions to enable the identification of similarities among concepts in diverse forms. However, in doing so, it also introduces severe complexities in the development. For instance, identifying dimensions believed to be relevant to meaningful recommendations requires extensive experimentation so that a functional model can be conceived.

Properties and Property Values

The CSO 310 uses properties, and these properties have one or more respective property values. An example of a property is "temperature" and a property value that belongs to that property would be "cold." The purpose of properties and property values in the CSO 310 is to act as attributes that capture the content of a concept. Table 5 below is a simplistic classification for the concept "fruit:"

TABLE 5

| Property | Property Value |
| --- | --- |
| Origin | Organic |
| Function | Nourish |
| Operation | Biological |
| Phase | Solid |
| | Liquid |
| Shape | Spheroid |
| | Cylindrical |
| Taste | Delicious |
| | Sweet |
| | Sour |
| Smell | Good food |
| Color | Red |
| | Orange |
| | Green |
| | Yellow |
| | Brown |
| Category | Kitchen/Gourmet |

Property values are also classed (event, object, animate, state). Concepts are associated to the property values that share the same class as themselves. For instance, the concept "accountant" is an animate, and hence all of its associated property values are also located in the "animate" class.

The main algorithm that the CSO 310 uses was designed to primarily return concepts that represent objects. Because of this, there is a table in the CSO 310 that links property values from events, animates and states to property values that are objects. This allows for the CSO 310 to associate concepts that are objects to concepts that are from other classes. An example of a linked property value is shown below:

TABLE 6

| Property:Property Value:Class | Related Property:Property Value:Class |
| --- | --- |
| Naturality:Action(Increase):Verb | Origin:Organic Object:Noun |

Property Value Weightings

FIG. 6A illustrates the output 600a of the CSO algorithm 310 when the words "glue" and "tape" are used as input. The algorithm 310 ranks at the top of the list 600a words 610 that have similar conceptual content when compared to the words used as input 605a. Each property value has a corresponding coefficient that is used in its weight. This weight is used to help calculate the strength of that property value in the CSO similarity calculation so that the more important properties, such as "shape" and "function" have more power than the less important ones, such as "phase." The weighting scheme ranges from 0 to 1, with 1 being a strong weight and 0 being a weak weight. 615 and 620 show scores that are calculated based on the relative weights of the property values.

Further, the CSO 310 may consider certain properties to be stronger than others, referred to as power properties. Two such power properties may be "User Age" and "User Sex." The power properties are used in the algorithm to bring concepts with matching power properties to the top of the list 600a. If a term is entered that has power properties, the final concept expansion list 600a is filtered to include only concepts 610 that contain at least one property value in the power property group. By way of example, if the term "woman" is entered into the CSO, the CSO will find all of the property values in the database for that concept. One of the property values for "woman" is Sex:Female. When retrieving similar concepts to return for the term "woman," the CSO 310 will only include concepts that have at least one property value in the "sex" property group that matches one of the property values of the entered term, "woman."

A key differentiator of the present invention's CSO technology 310 is that it allows for a search of wider scope, i.e., one that is more general and wide-ranging than traditional data mining. Current implementations, such as Google Sets, as illustrated in FIG. 6B, however, are purely based on the statistical analysis of the occurrences of terms on the World Wide Web.

Figure 6D:
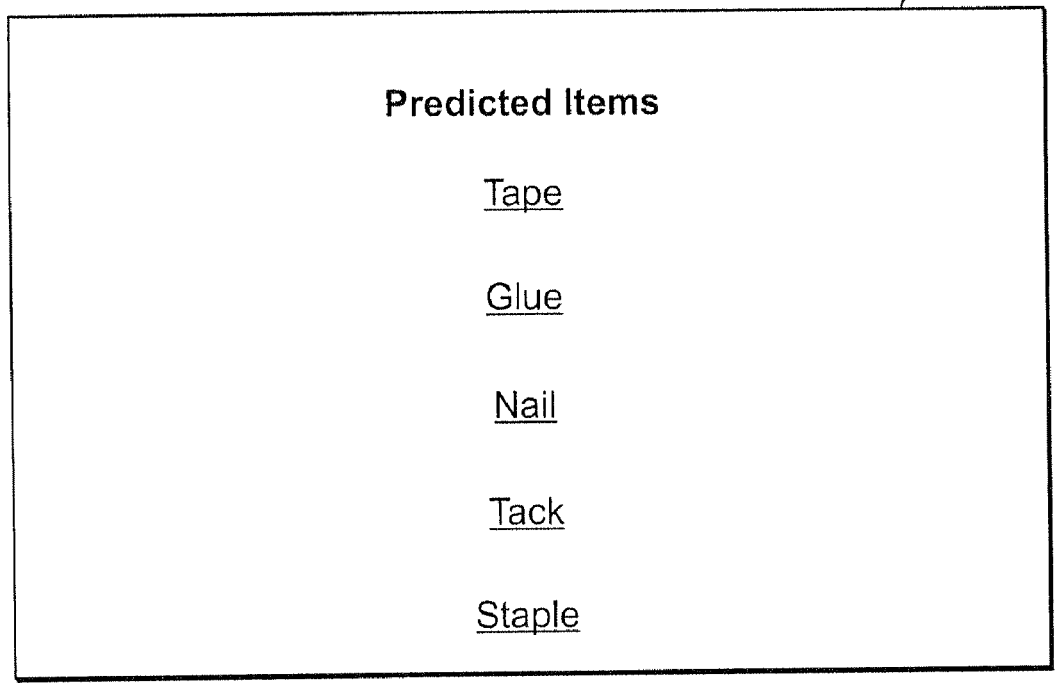

In fact, this difference in technology is highlighted when comparing FIGS. 6A and 6C with 6B and 6D. The output list 600c from the CSO algorithm based on three input words (glue, tape, nail) 605c, as illustrated in FIG. 6C, is considerably larger and more diverse than the output list 600a generated by the CSO algorithm with two words (glue, tape) as input 605a, as shown in FIG. 6A. In contrast, the statistical Google Sets list 600d of FIG. 6D is smaller than the list 600b of FIG. 6B because that technology relies only on occurrences of terms on the World Wide Web.

Data Processing

Figure 7:
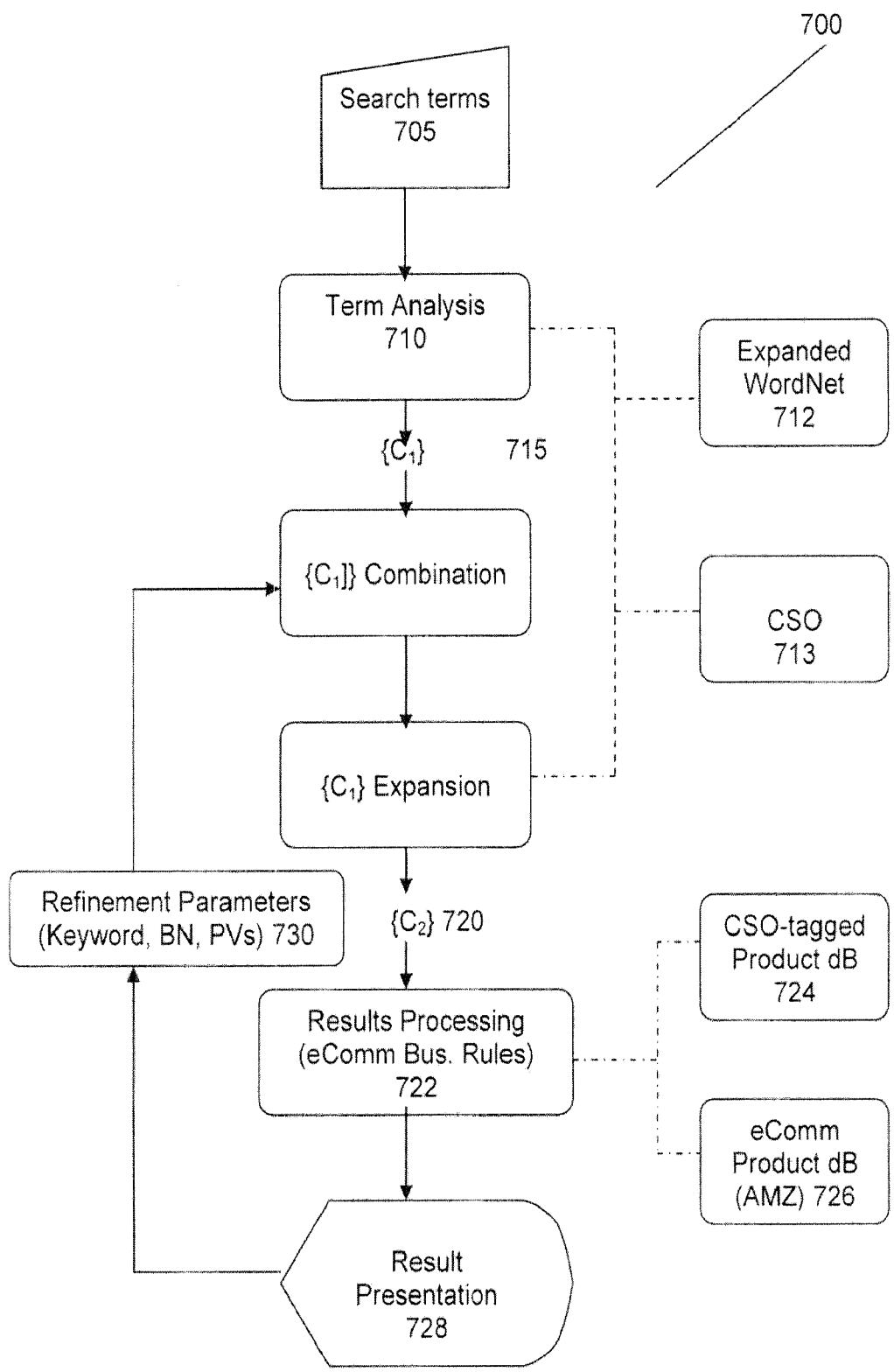
FIG. 7 is a flow diagram of the method of the Concept Specific Ontology according to an aspect of the present invention.

In operation, as illustrated in the flow chart 700 of FIG. 7, an example embodiment of the CSO 310, at step 705, takes a string of terms and, at step 710, analyzes the terms. At step 715, the CSO 310 parses the entry string into unique terms and applies a simple natural language processing filter. At step 715, a pre-determined combination of one or more words is removed from the string entered. Below, in Table 7, is an example list of terms that are extracted out of the string entered into the application:

TABLE 7

| all | likes | she | he | were |
|---|---|---|---|---|
| some | loves | hers | his | interested |
| every | wants | day old | on | in |
| each | year | days old | by | interests |
| exactly | years | the | over | interest |
| only | year old | love | under | its |
| other | years old | if | beside | had |
| a | months | but | per | have |
| who | old | needs | need | has |
| is | month old | whom | turning | want |
| an | and | also | age | wants |
| I | or | though | them | of |
| me | not | although | out | to |
| we | just | unless | ours | at |
| us | is | my | liked | was |
| they | are | it | loved | their |

The CSO 310 attempts to find the individual parsed terms in the CSO list of concepts 713. If a term is not found in the list of known concepts 713, the CSO 310 can use simple list and synsets to find similar terms, and then attempt to match these generated expressions with concepts 713 in the CSO 310. In another example, the CSO 310 may use services such as WordNet 712 to find similar terms. The order of WordNet 712 expansion is as follows: synonyms—noun, synonyms—verb, hypernyms—noun, co-ordinate terms—noun, co-ordinate terms—verb, meronyms—noun. This query to WordNet 712 produces a list of terms the CSO 310 attempts to find in its own database of terms 713. As soon as one is matched, the CSO 310 uses that concept going forward. If no term from the WordNet expansion 712 is found, that term is ignored. If only states from the original term list 705 are available, the CSO 310 retrieves the concept "thing" and uses it in the calculation going forward.

The CSO 310 then creates property value (PV) sets based on the concepts found in the CSO concepts 713. The list 715 of initial retrieved concepts is referred to as $C_1$. Three property value sets are retrieved for $C_1$: a) PV set 1a, Intersect[$C_1$, n, v, a]; b) PV set 1b, Union[$C_1$, n, v, a], where n is noun, v is verb, and a is animate; and PV set 2, Union[$C_1$, s], where property value yes=1 for states.

The CSO 310 then performs similarity calculations and vector calculation using weights of each PV set. Weighted Total Set (WTS) is the summation of weights of all property values for each PV set. Weighted Matches (WM) is the summation of weights of all matching PVs for each CSO concept relative to each PV set. The Similarity Score (S) is equal to WM/WTS.

The CSO 310 then applies the power property filter to remove invalid concepts. At step 720, the CSO 310 then creates a set of concepts $C_2$ based on the following rules. $C_2$ is the subset of CSO nouns where $S_{1a}>0$. If $C_2$ has fewer than X elements (X=60 for default), then use $S_{1b}>0$ followed by $S_2>0$ to complete set. Order keywords by $S_{1a}$, $S_{1b}$, $S_2$ and take the top n values (n=100 for default). Order keywords again by $S_2$, $S_{1a}$, $S_{1b}$ and take the top x values (x=60 for default).

At step 722, results processing occurs. The results mixer 360 determines how the terms are fed into the ICA 305 or CSO 310 and how data in turn is fed back between the two systems. In addition, rules can be applied which filter the output to a restricted set (e.g., removing foul language or domain inappropriate terms). The power properties that need to be filtered are determined. The CSO domain to use and the demographic components of the ICA database to use are also determined. The results processing connects to the content databases to draw back additional content specific results (e.g., products, not just a keyword cloud). For example, at step 724, it connects to the CSO-tagged product database of content (e.g., products or ads), which has been pre-tagged with terms in the CSO database. This access enables the quick display of results. At 726, it connects to the e-commerce product database, which is an e-commerce database of products (e.g., Amazon). The results processor (722) passes keywords to the database to search text for best matches and display as results. At 728, the results are presented using the user interface/application programming interface component 355 of this process. The results are displayed, for example, to the user or computer. At 730, the search results can be refined. For example, the user can select to refine their results by restricting results to a specific keyword(s), Property Value(s) (PV) or an e-commerce category (such as Amazon's BN categories).

Manage Users

The CSO 310 may have users (ontologists) who edit the information in it in different ways. Management tools 362 are provided to, for example, set user permissions. These users will have sets of permissions associated with them to allow them to perform different tasks, such as assigning concepts to edit, etc. The editing of users using the management tools 362 should allow user creation, deletion, and editing of user properties, such as first name, last name, email address and password, and user permissions, such as administration privileges.

Users should have a list of concepts that they own at any given time. There are different status tags associated with a concept, such as "incomplete," "for review" and "complete." A user will only own a concept while the concept is either marked with an "incomplete" status, or a status "for review." When a concept is first added to the CSO concepts 713, it will be considered "incomplete." A concept will change from "incomplete" to "for review" and finally to "complete." Once the concept moves to the "complete" status, the user will no longer be responsible for that concept. A completed concept entry will have all of its property values associated with it, and will be approved by a senior ontologist.

An ontologist may input concept data using the Concept Input Form 800, as illustrated in FIGS. 8A-8E. FIGS. 8A-8B illustrate the Concept Input Form 800 for the concept "door" 805a. The Concept Input Form 800 allows the ontologist to assign synonyms 810, such as "portal," for the concept 805a. Further, a list of properties 815, such as "Origin," "Function," "Location of Use" and "Fixedness," is provided with associated values 820, such as "Organic Object," "Inorganic Natural," "Artifact," "material," and so on, has a method to select 825 that value. Here, "Artifact," "mostly indoors" and "fixed" are selected to describe the "Origin," "Location Of Use," and "Fixedness" of a "door" 805a, respectively. Further, there is a description field 830 that may describe the property and each value in helping the ontologist correctly and accurately input the concept data using the Concept Input Form 800. FIGS. 8C-8E similarly illustrate the Concept Input Form 800 for the concept "happy" 805c. Here, the values "Animate," "Like," "Happy/Funny," "Blissful," and "Yes" are selected to describe the properties "Describes," "Love," and "Happiness" for the concept "happy" 805c, respectively.

Further, as described above with reference to FIG. 6A, each property value has a corresponding weight coefficient. An ontologist may input these coefficient values 915 using the Settings form 900, as illustrated in FIG. 9. Here, each value 920 associated with each property 915 may be assigned a coefficient 925 on a scale of 1 to 10, with 1 being a low weighting and 10 being a high weighting. These properties 915, values 920 and descriptions 930 correspond to the properties 815, values 820 and descriptions 830 as illustrated in FIGS. 8A-8E with reference to the Concept Input Form 800.

Multiple Ontology Application

The data model can support the notion of more than one ontology. New ontologies will be added to the CSO 310. When a new ontology is added to the CSO 310 it needs a name and weighting for property values.

One of the ways that ontologies are differentiated from each other is by different weighting, as a per concept property value level. The CSO 310 applies different weighting to property values to be used in the similarity calculation portion of the algorithm. These weightings also need to be applied to the concept property value relationship. This will create two levels of property value weightings. Each different ontology applies a weight to each property per concept. Another way a new ontology can be created is by creating new properties and values.

Domain Templates

The present invention's CSO technology 310 may also adapt to a company's needs as it provides a dynamic database that can be customized and constantly updated. The CSO 310 may provide different group templates to support client applications of different niches, specifically, but not limited to, e-commerce. Examples of such groups may include "vacation," "gift," or "default." The idea of grouping may be extendable because not all groups will be known at a particular time. The CSO 310 has the ability to create new groups at a later time. Each property value has the ability to indicate a separate weighting for different group templates. This weighting should only be applicable to the property values, and not to the concept property value relation.

Dynamic Expansion Algorithms

In the CSO 310, concept expansion uses an algorithm that determines how the concepts in the CSO 310 are related to the terms taken in by the CSO 310. There are parts of this algorithm that can be implemented in different ways, thereby yielding quite different results. These parts may include the ability to switch property set creation, the calculation that produces the similarity scores, and finally the ordering of the final set creation.

Property set creation may be done using a different combination of intersections and unions over states, objects, events and animates. The CSO 310 may have the ability to dynamically change this, given a formula. Similarity calculations may be done in different ways. The CSO 310 may allow this calculation to be changed and implemented dynamically. Sets may have different property value similarity calculations. The sets can be ordered by these different values. The CSO may provide the ability to change the ordering dynamically.

API Access

The CSO 310 may be used in procedure, that is, linked directly to the code that uses it. However, a layer may be added that allows easy access to the concept expansion to allow the CSO 310 to be easily integrated in different client applications. The CSO 310 may have a remote façade that exposes it to the outside world. The CSO 310 may expose parts of its functionality through web services. The entire CSO application 310 does not have to be exposed. However, at the very least, web services may provide the ability to take in a list of terms along with instructions, such as algorithms, groups, etc., and return a list of related terms.

Iterative Classification Feedback—Combining ICA and CSO Results

Figure 10A:
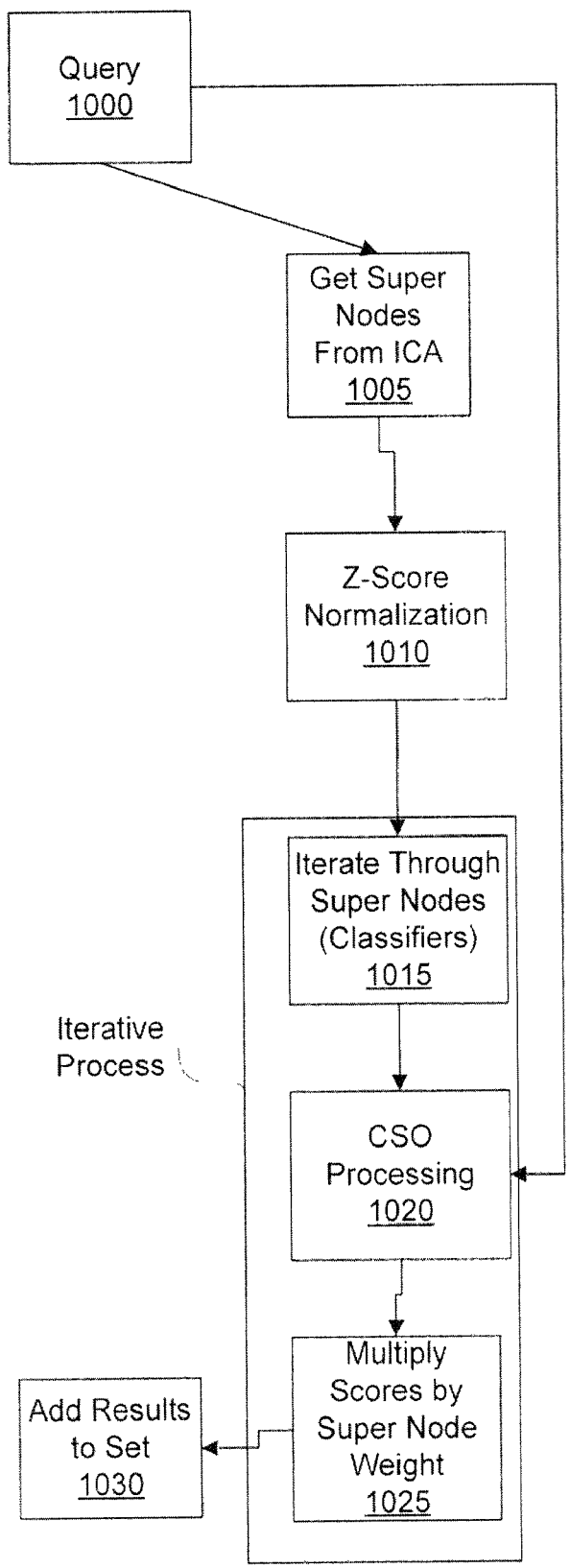
FIGS. 10A-10B are flow charts illustrating combining results from the Interest Correlation Analyzer and Concept Specific Ontology through Iterative Classification Feedback according to an aspect of the present invention.

Results from the ICA and the CSO may be combined through a process referred to as Iterative Classification Feedback (ICF). As illustrated in FIGS. 3A and 10A, the ICA 305 is used, as described above, as a classifier (or profiler) that narrows and profiles the query according to the feed data from the ICA 305. The term analyzer 363 is responsible for applying Natural Language Processing rules to input strings. This includes word sense disambiguation, spelling correction and term removal. The results mixer 360 determines how the terms are fed into the ICA 305 or CSO 310 and how data in turn is fed back between the two systems. In addition, rules can be applied which filter the output to a restricted set (e.g., removing foul language or domain inappropriate terms). The results mixer 360 also determines what power properties to filter on, what CSO domain to use and what demographic components of the ICA database to use (e.g., for a Mother's Day site, it would search the female contributors to the ICA database).

The super nodes (384 of FIG. 3B) generated by the ICA as a result of a query 1000 are retrieved from the ICA 1005 and normalized 1010. The top n nodes (super nodes) are taken from the set (for example, the top three nodes). Each concept of the super nodes is fed individually through an iterative process 1015 with the original query to the CSO 1020 to generate more results. The CSO, as described above, will produce a result of scored concepts. The results are then normalized to assure that the scores are between zero and one.

Both the ICA and CSO generate an output. However, the ICA additionally determines the super nodes associated with the input terms which are input back into the CSO 1020 to generate new results. Thus, the CSO process 1020 acts as a filter on the ICA results 1005. The output of the CSO processing 1020 is a combination of the results as calculated by the CSO from the input terms and the result as calculated by the super nodes generated by the ICA 1005 and input into the CSO. All the scores from the CSO are then multiplied by the weight of the super node 1025. This process is iterated through all the super nodes, with the final scores of the concepts being added up 1030. After the completion of all iterations, the final list of ICF scored concepts is provided as the end result.

Figure 10B:
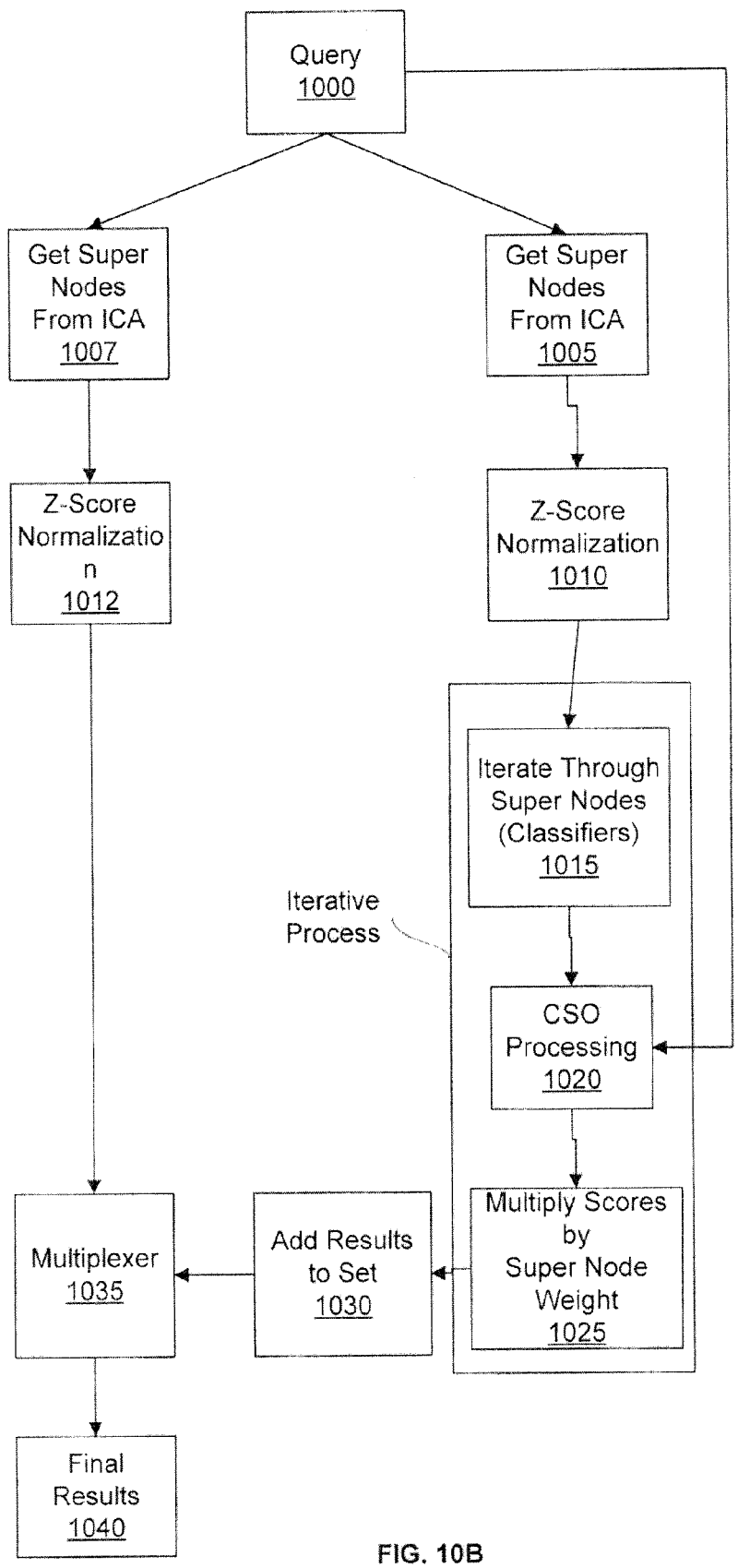

However, as illustrated in FIG. 10B, the final set of output terms may also be populated with direct results from the ICA. Here, after producing the final scored concepts from the ICF as in FIG. 10A, a list of Level 1 super nodes (384 of FIG. 3B) is retrieved from the ICA (step 1007) and normalized 1012. A multiplexer 1035 then uses these two sets of results to identify the relative quality of each set and outputs the sets using the ratio of the relative qualities to the final ICF result 1040.

Example Applications

Figure 11:
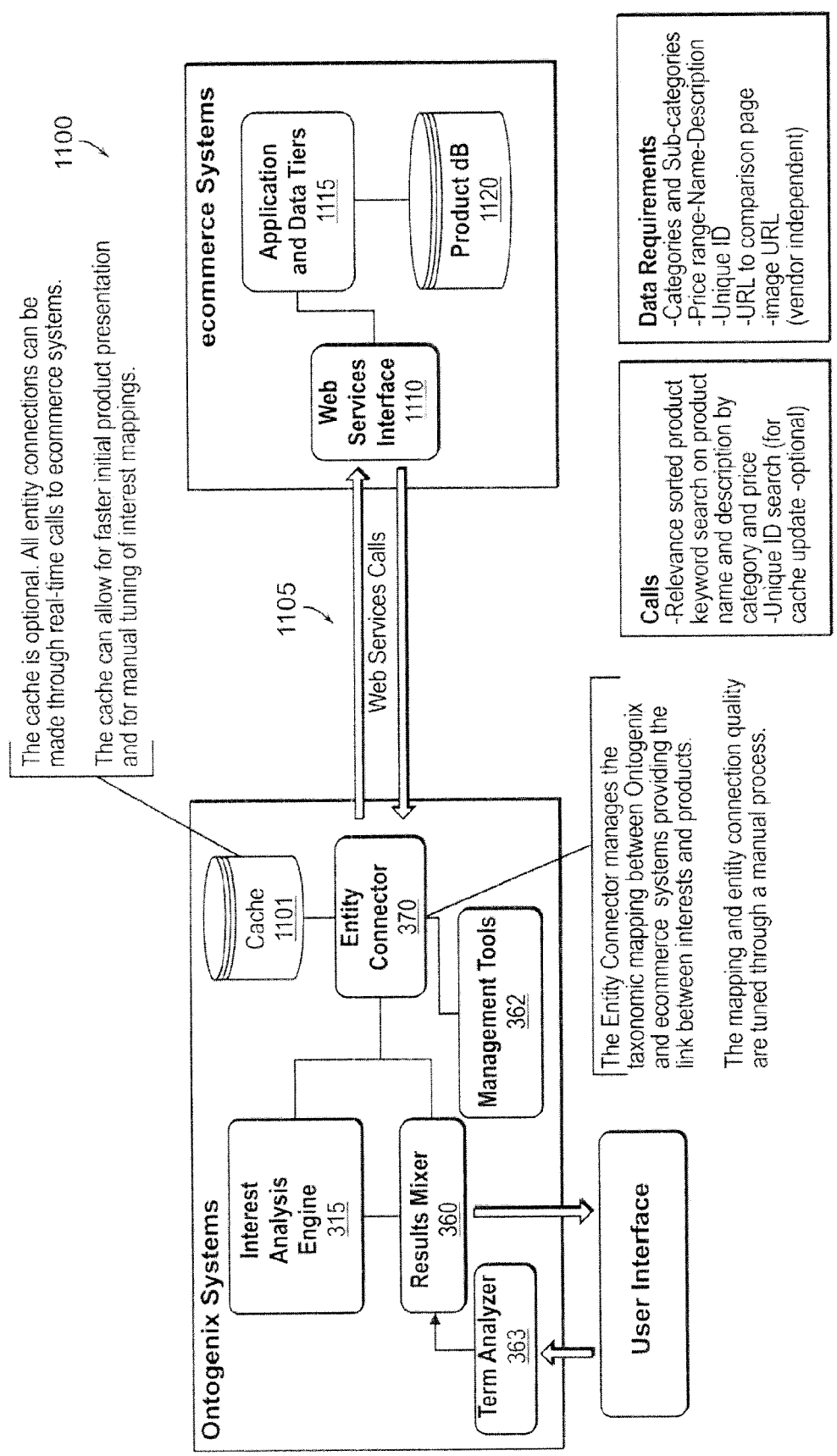
FIG. 11 is a diagram illustrating the connection of an external web service to the recommendation system (Interest Analysis Engine) according to an aspect of the present invention.

The recommendation system 300, including the ICA engine 305 and CSO 310, may be employed by web services, such as online merchants, for making product recommendations to customers. As illustrated in FIG. 11, the ICA engine 305 may interface with an entity connector 370 for making connections to web services 1100 via web services calls 1005 from a web services interface 1110. The data passed to and from the web services interface 1110 and the entity connector 370 may be stored in a cache 1101. The cache 1101 can allow for faster initial product presentation and for manual tuning of interest mappings. However, all entity connections may be made through real-time calls 1105.

The entity connector 370 manages the taxonomic mapping between the ICA engine 305 and the web service 1100, providing the link between interests and products 365. The mapping and entity connection quality may be tuned, preferably, through a manual process.

Web service calls 1005 between the entity connector 370 and the web services interface 1110 may include relevance-sorted product keyword searches, searches based on product name and description, and searches sorted by category and price. The product database 1120 may have categories and subcategories, price ranges, product names and descriptions, unique identifiers, Uniform Resource Locators (URLs) to comparison pages, and URLs to images.

Figure 12A:
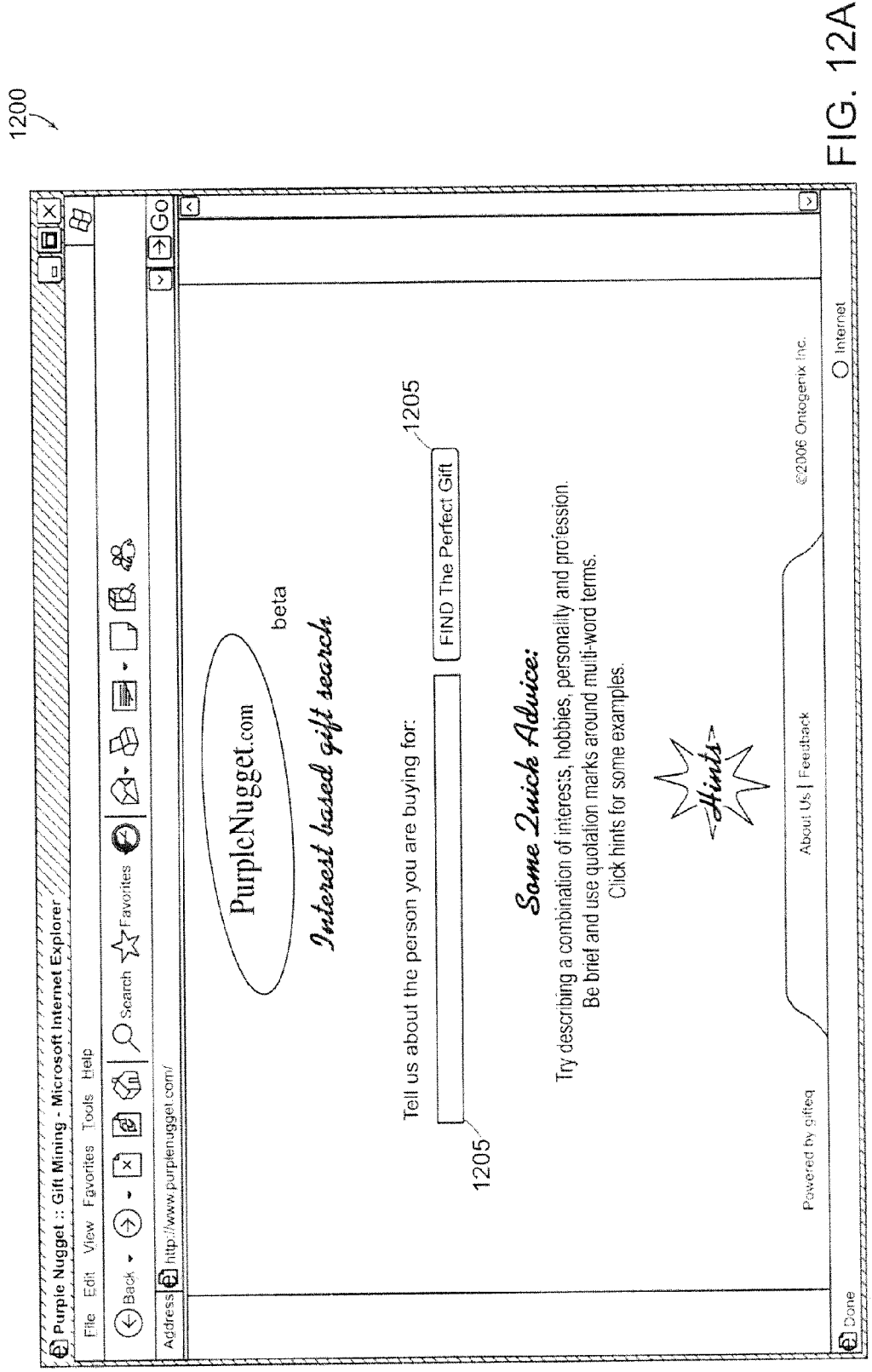
Figure 12B:
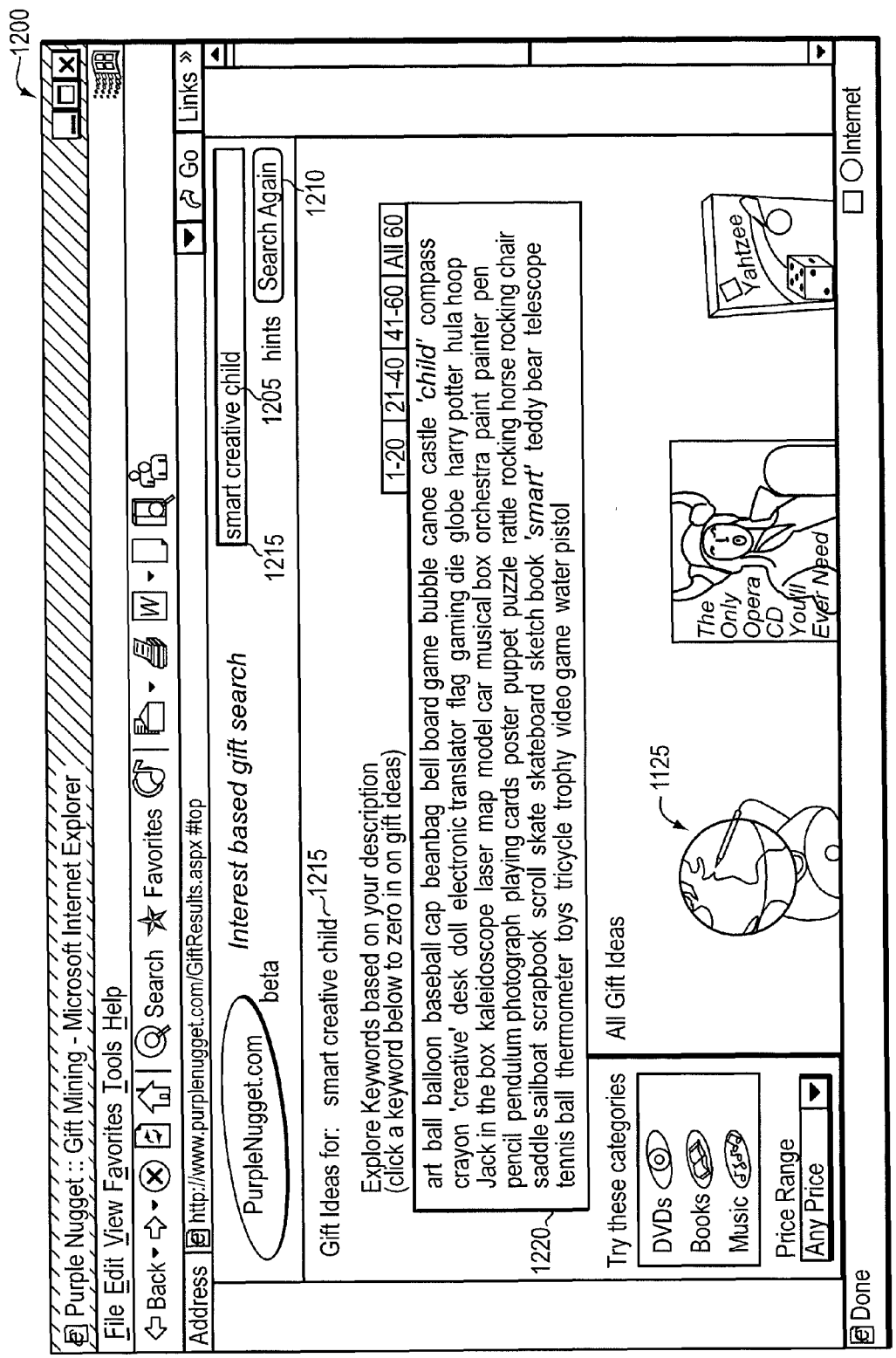

Thus, based on this connection, a web-based application may be created, as illustrated in FIGS. 12-19 As illustrated in FIG. 12A, a gift-recommendation website employing the recommendation system 300 of the present invention, which is shown in this example as PurpleNugget.com 1200, provides a text box 1205 and search button 1210. When search terms, such as "smart," "creative," and "child," are entered, as illustrated at 1215 in FIG. 12B, additional suggested keywords 1220 are provided along with suggested gift ideas 1225.

Figure 13:
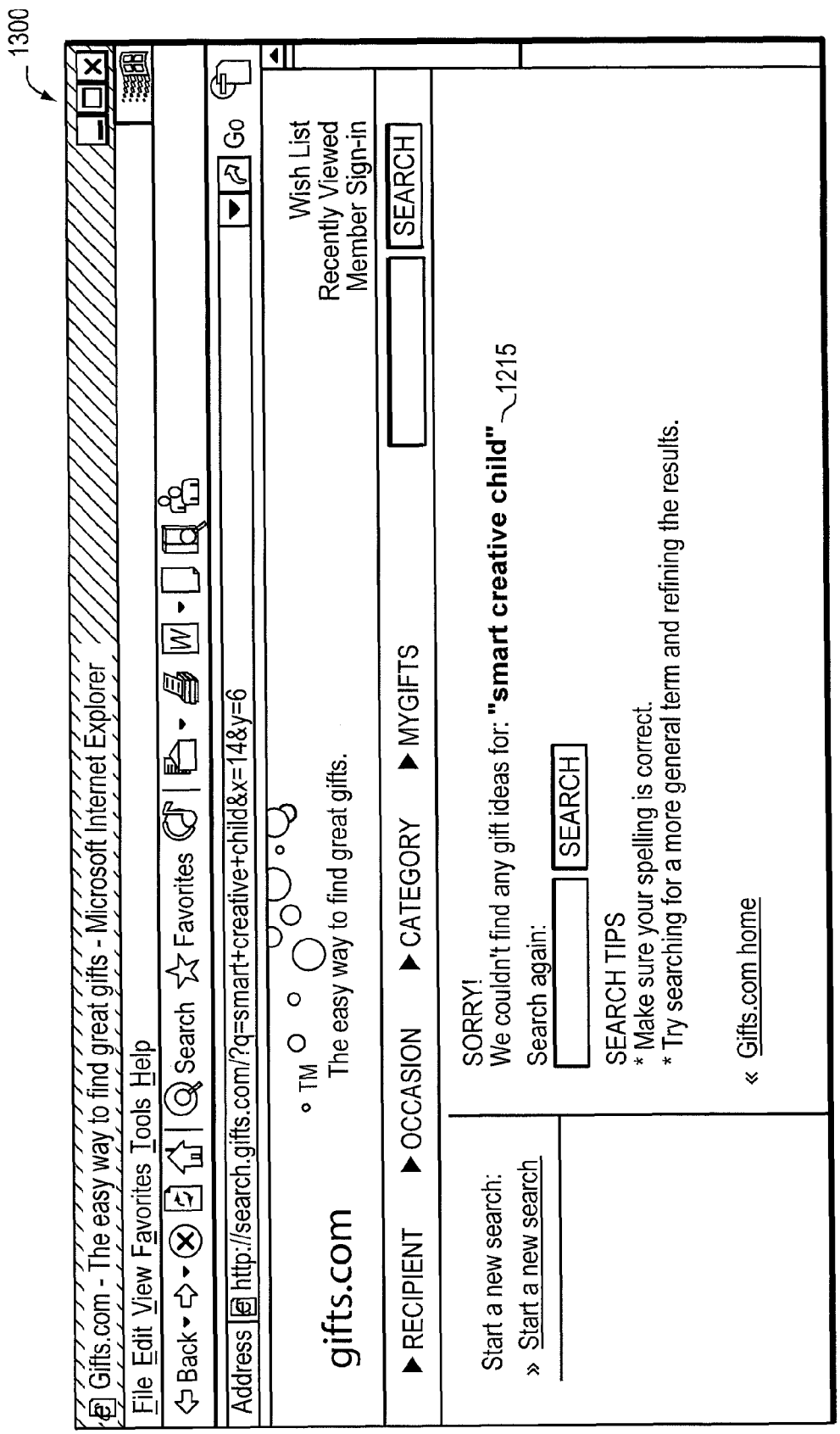

In comparison, as illustrated in FIG. 13, as search for the same terms 1215 "smart," "creative," and "child" on a conventional e-commerce website, such as gifts.com 1300, yields no search results.

Figure 14A:
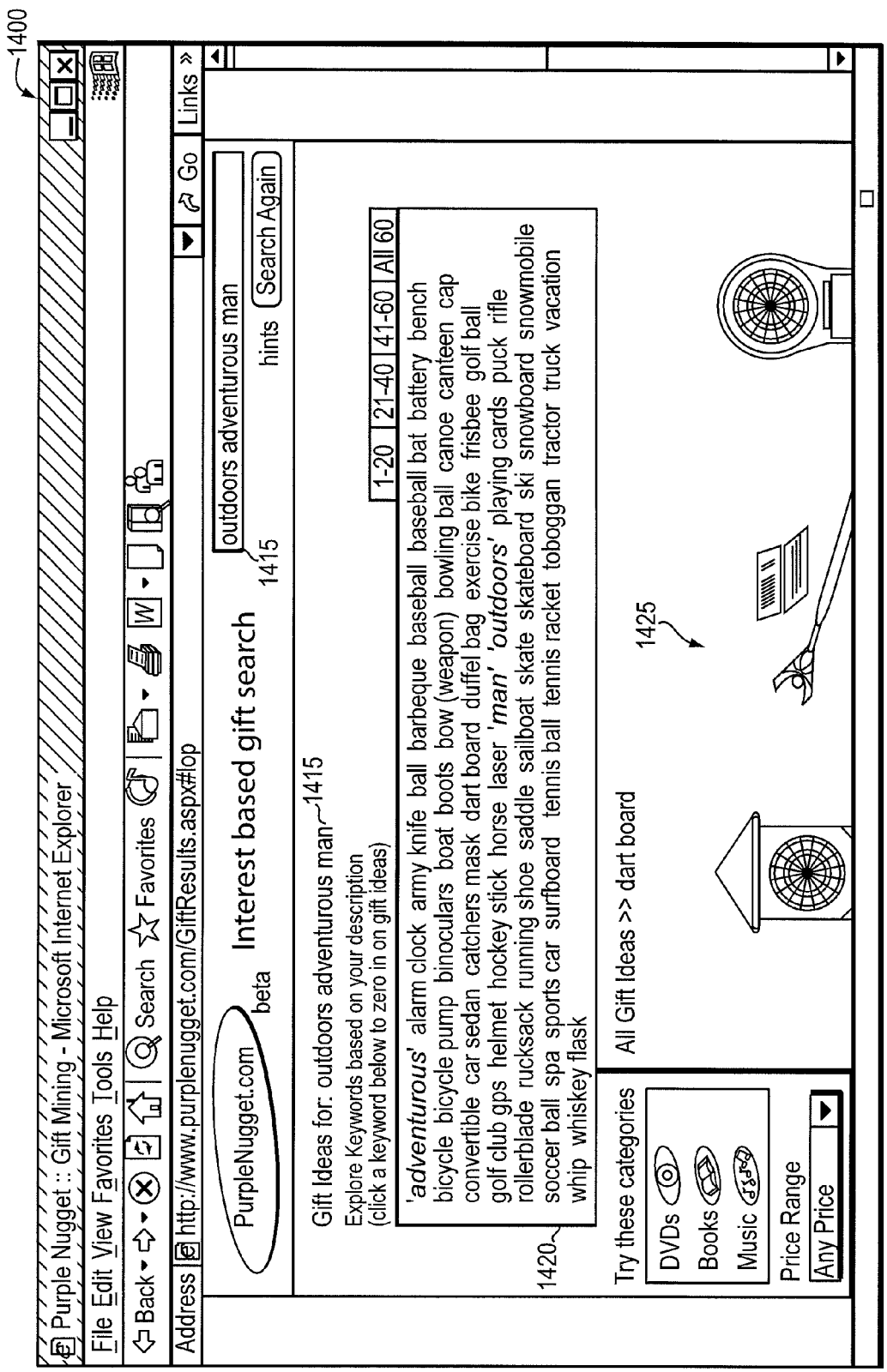
Figure 14B:
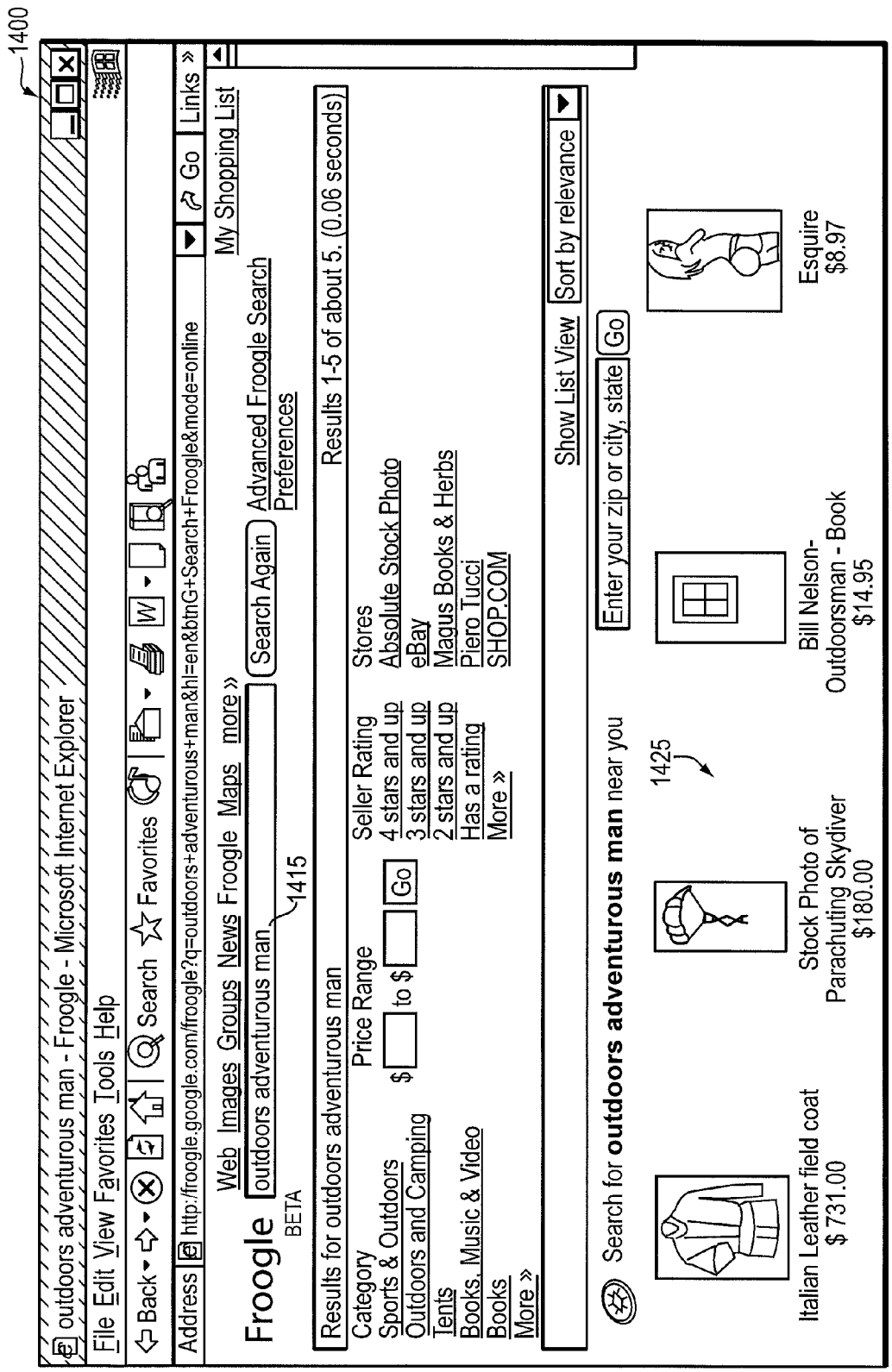

A search for "outdoor," "adventurous," "man" 1415 on PurpleNugget.com 1200 as illustrated in FIG. 14A, however, yields numerous suggested keywords 1220 and gift results 1225. In contrast, an identical search 1415 on an e-commerce website not employing the ICA engine 305 of the present invention, such as froogle.google.com 1400, as illustrated in FIG. 14B, yields limited results 1425 and does not provide any additional keywords.

Figure 14C:
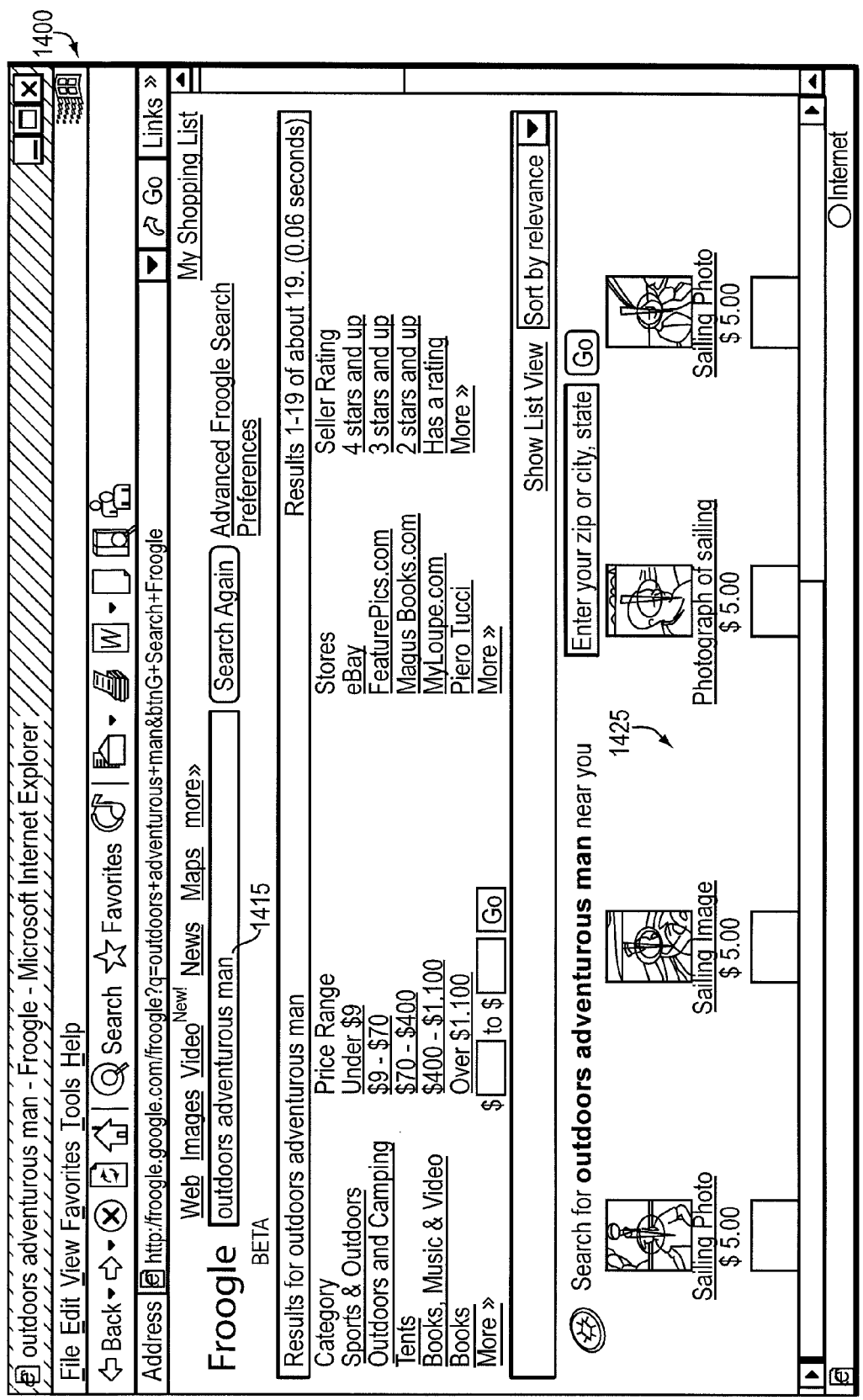
Figure 15:
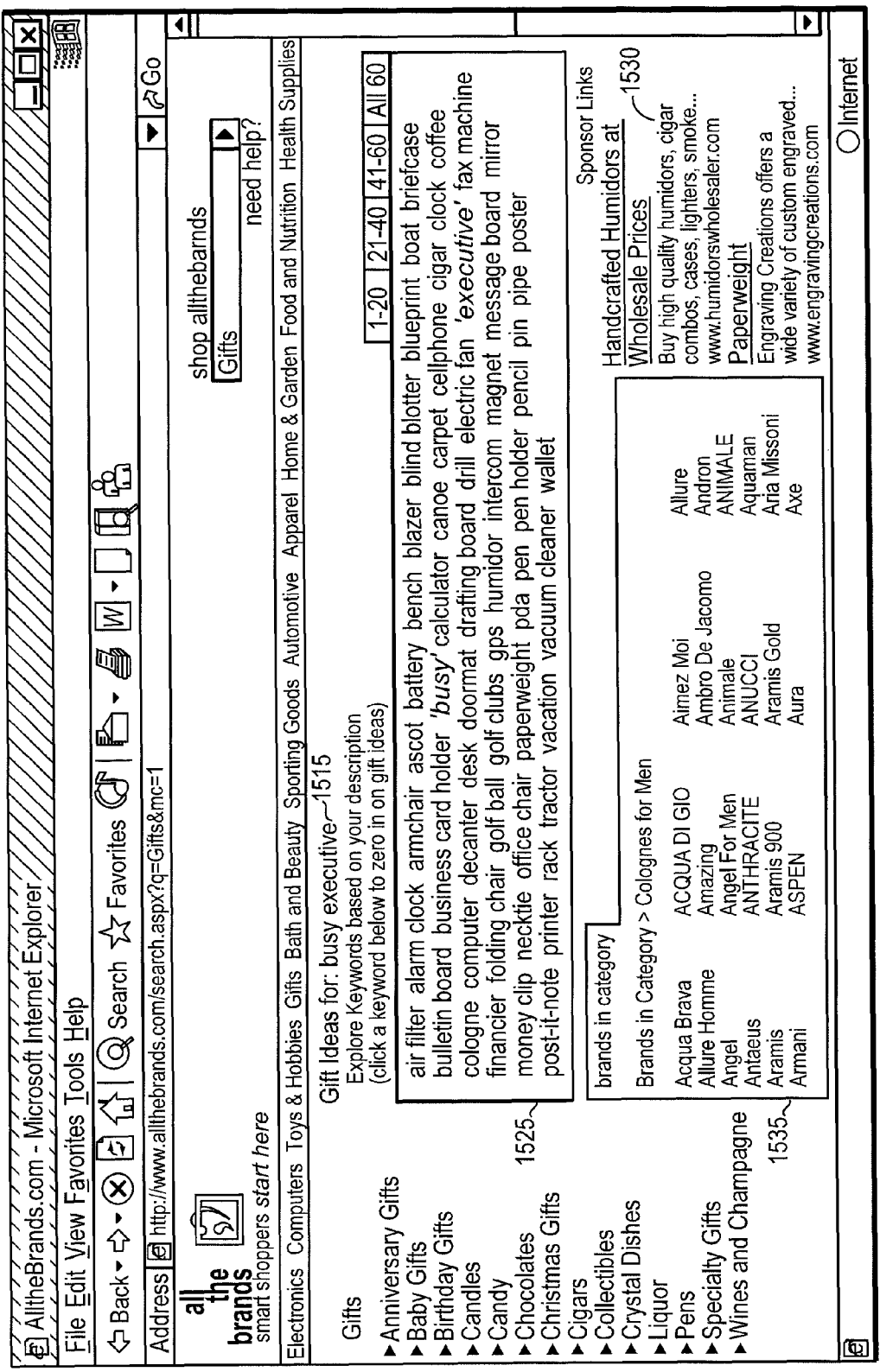

By coupling components of the recommendation system 300 of the present invention to conventional product search technology, such as froogle.google.com 1400, a greater and more varied array of suggested gifts 1425 can be provided, as illustrated in FIG. 14C. A user can enter a query that consists of interests or other kinds of description of a person. The system returns products that will be of interest to a person who matches that description.

The recommendation system 300 may also be employed in applications beyond gift suggestion in e-commerce. The system can be adapted to recommend more than products on the basis of entered interests, such as vacations, services, music, books, movies, and compatible people (i.e. dating sites). In the example shown in FIG. 15, a search for particular keywords 1515, may provide not only suggested keywords 1525 but also advertisements 1530 and brands 1535 related to those keywords. Based on an entered set of terms, the system can return ads that correspond to products, interests, vacations, etc. that will be of interest to a person who is described by the entered search terms.

Figure 16A:
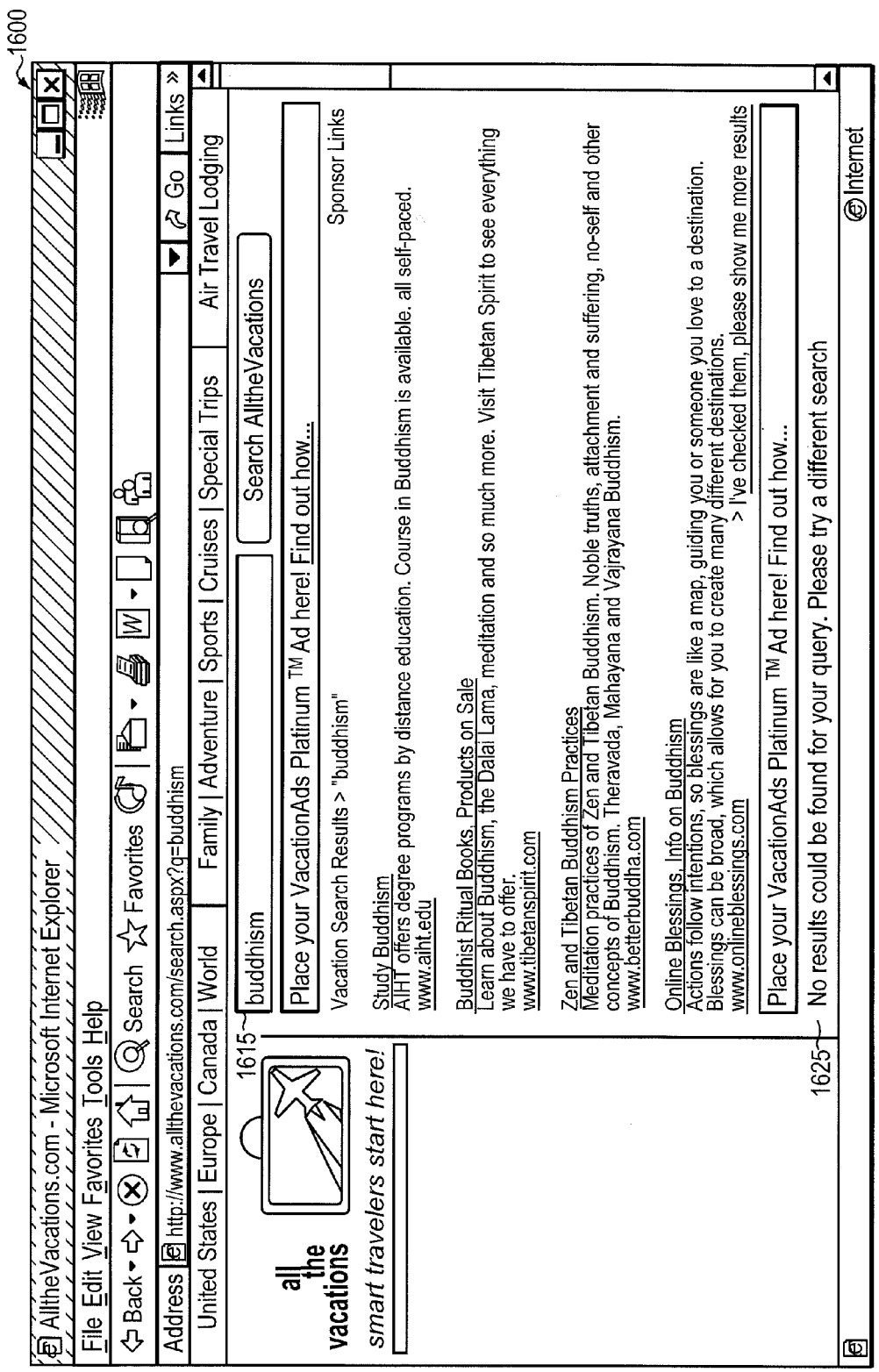

Further, a search on a traditional vacation planning website, such as AlltheVacations.com 1600, as illustrated in FIG. 16A, provides no results 1625 for a search with the keyword 1615 "Buddhism." However, as illustrated in FIG. 16B-1 through 16B-3, by adding components of the recommendation system 300 of the present invention to conventional search technology 1600 provides a broader base of related search terms 1640, yields search results 1635 suggesting a vacation to Thailand, and provides search-specific advertising 1630.

Figure 17A:
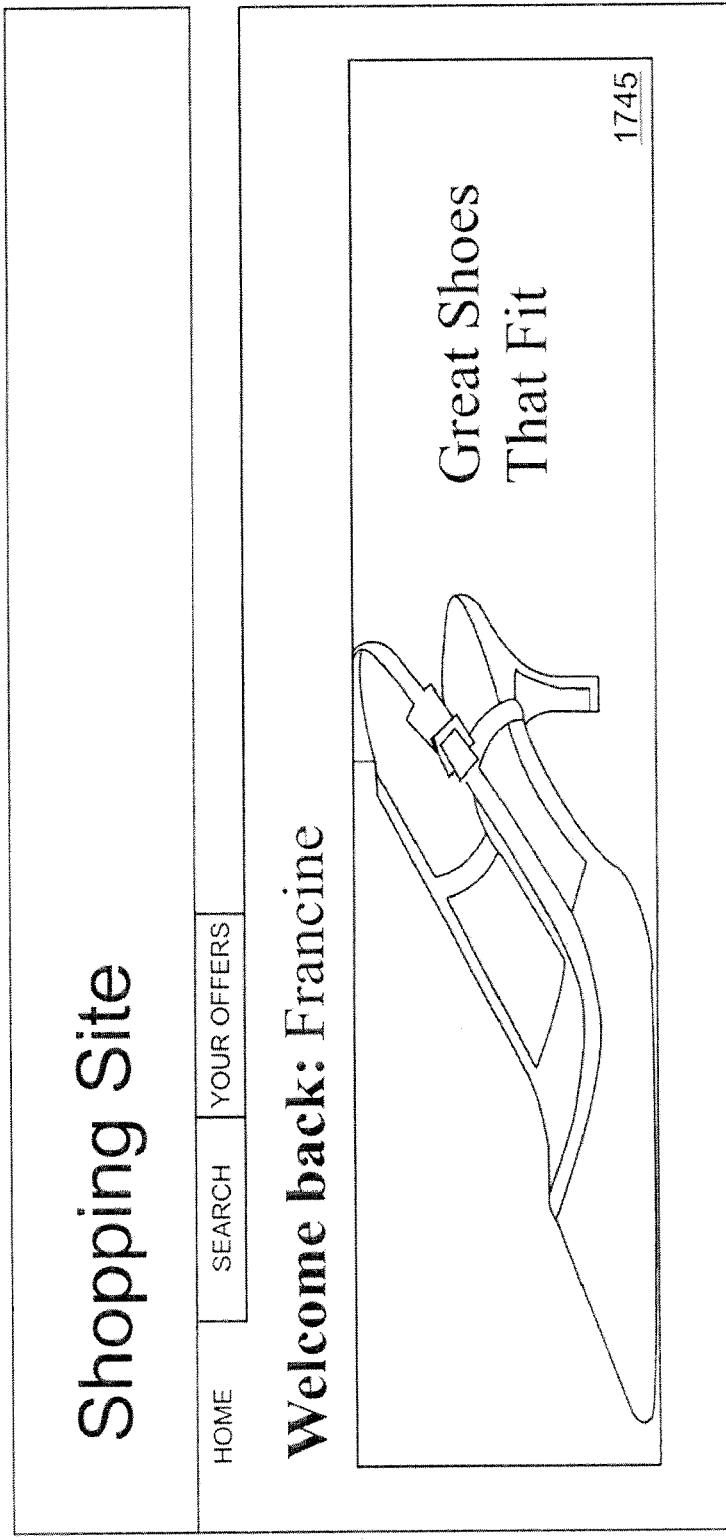
Figure 17B:
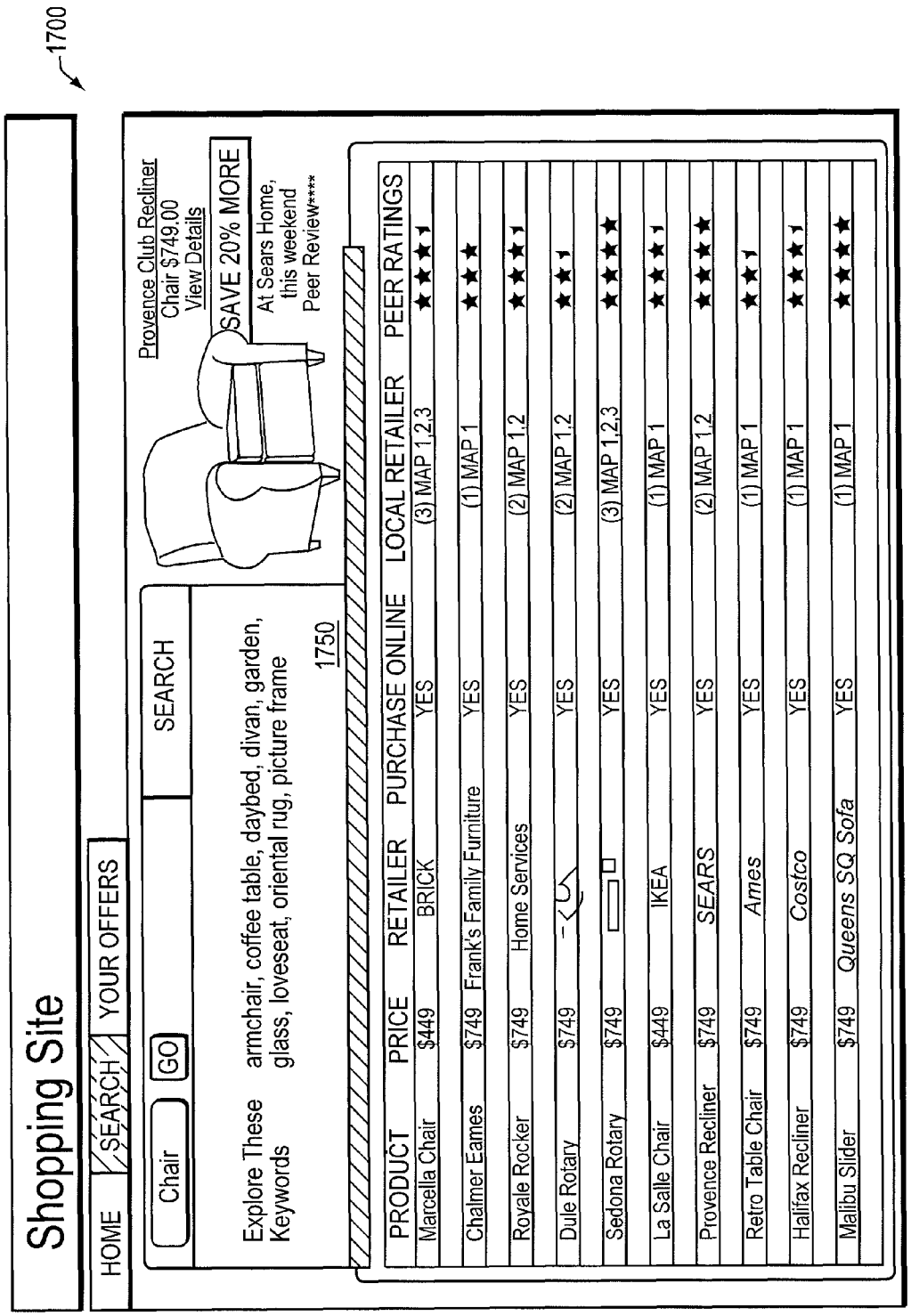
Figure 17C:
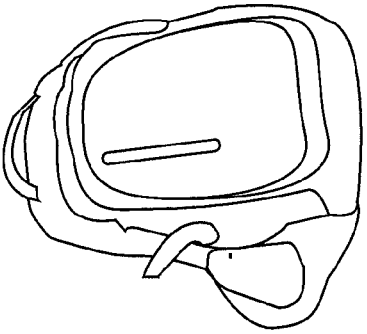

Moreover, value may be added to websites 1700, by allowing product advertisements 1745 aligned with consumer interests to be provided, as illustrated in FIG. 17A; suggested keywords 1750 based on initial search terms may be supplied, as illustrated in FIG. 17B; or hot deals 1755 may be highlighted based on user interest, as illustrated in FIG. 17C.

Figure 18:
Figure 19:
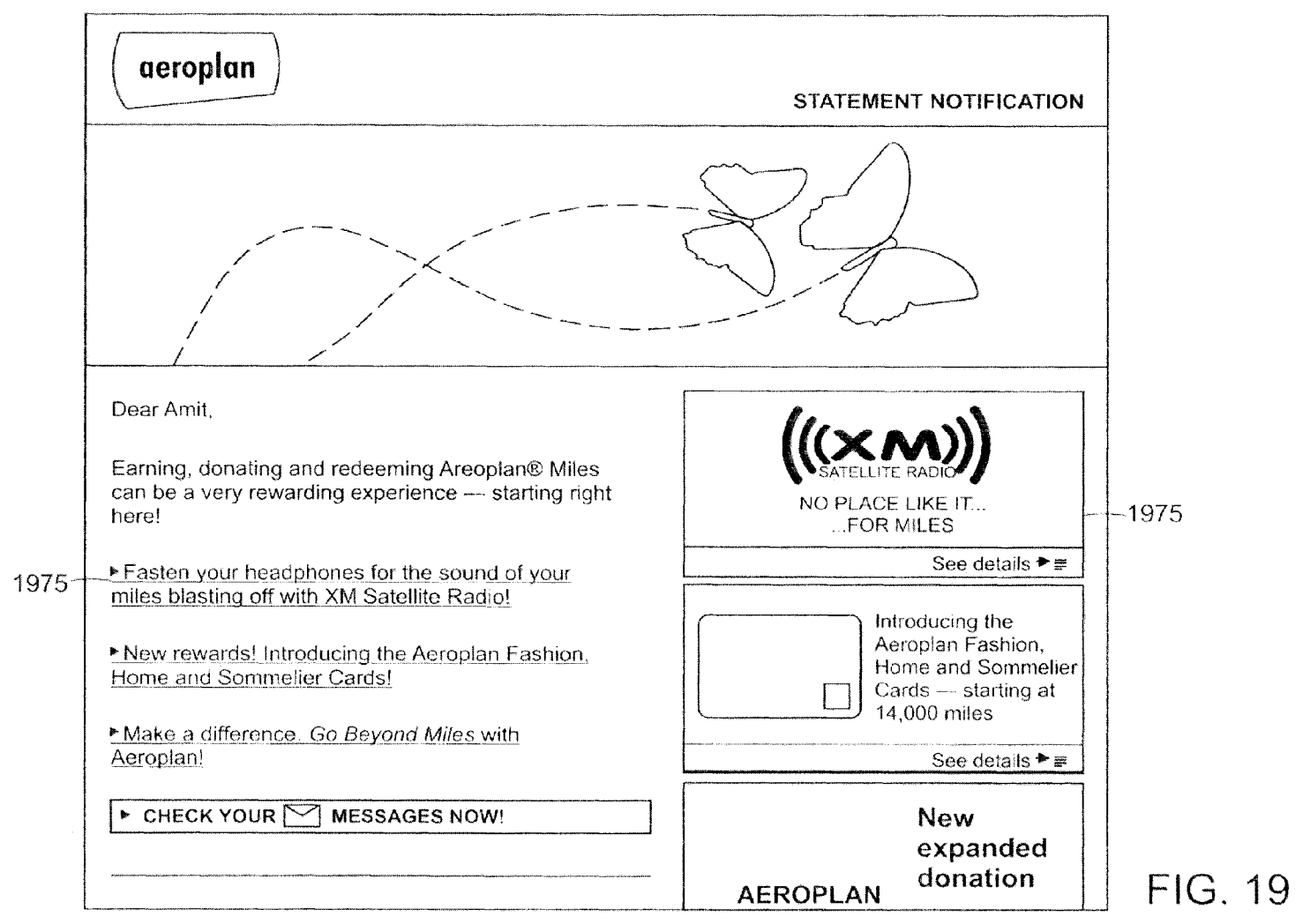

The recommendation system 300 of the present invention can be used in long term interest trend forecasting and analysis. The recommendation system 300 bases its recommendations in part on empirically correlated (expressions of) interests. The data can be archived on a regular basis so that changes in correlations can be tracked over time (e.g. it can track any changes in the frequency with which interests A and B go together). This information can be used to build analytical tools for examining and forecasting how interests change over time (including how such changes are correlated with external events). This can be employed to help online sites create, select and update content. For example, suggestive selling or cross-selling opportunities 1870, as illustrated in FIG. 18, may be created by analyzing the terms of a consumer search. Reward programs 1975, such as consumer points programs, may be suggested based on user interest, as illustrated in FIG. 19.

The recommendation system 300 of the present invention can be used to improve search marketing capability. Online marketers earn revenue in many cases on a 'pay-per-click' (PPC) basis; i.e. they earn a certain amount every time a link, such as an online advertisement, is selected ('clicked') by a user. The value of the 'click' is determined by the value of the link that is selected. This value is determined by the value of the keyword that is associated with the ad. Accordingly, it is of value for an online marketer to have ads generated on the basis of the most valuable keywords available. The recommendation system 300 can analyze keywords to determine which are the most valuable to use in order to call up an ad. This can provide substantial revenue increase for online marketers.

The recommendation system 300 of the present invention can be used to eliminate the "Null result." Usually, traditional search technologies return results based on finding an exact word match with an entered term. Often, an e-commerce database will not contain anything that is described by the exact word entered even if it contains an item that is relevant to the search. In such cases, the search engine will typically return a 'no results found' message, and leave the user with nothing to click on. The present recommendation system 300 can find relations between words that are not based on exact, syntactic match. Hence, the present recommendation system 300 can eliminate the 'no results' message and always provide relevant suggestions for the user to purchase, explore, or compare.

The recommendation system 300 of the present invention can be used to expand general online searches. It is often in the interest of online companies to provide users with a wide array of possible links to click. Traditional search engines often provide a very meager set of results. The recommendation system 300 of the present invention will in general provide a large array of relevant suggestions that will provide an appealing array of choice to online users.

The recommendation system 300 of the present invention can be used in connection with domain marketing tools. It is very important for online domains (web addresses) to accurately and effectively direct traffic to their sites. This is usually done by selecting keywords that, if entered in an online search engine, will deliver a link to a particular site. The recommendation system 300 of the present invention will be able to analyze keywords and suggest which are most relevant and cost effective.

The recommendation system 300 of the present invention can be used in connection with gift-card and poetry generation. The recommendation system 300 of the present invention can link ideas and concepts together in creative, unexpected ways. This can be used to allow users to create specialized gift cards featuring uniquely generated poems.

Processing Environment

Figure 20:
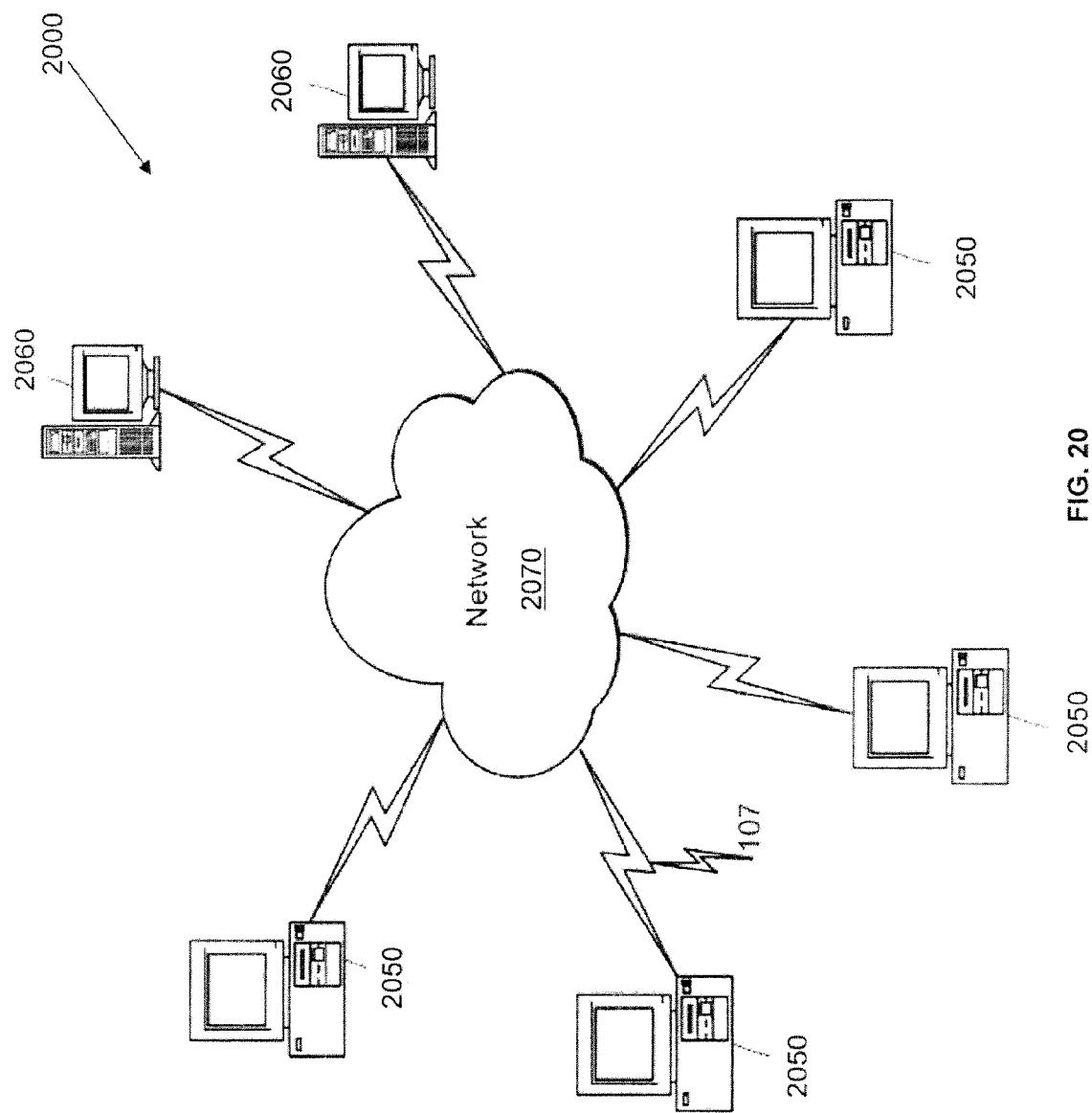
FIG. 20 is a schematic illustration of a computer network or similar digital processing environment in which embodiments of the present invention may be implemented.

FIG. 20 illustrates a computer network or similar digital processing environment 2000 in which the present invention may be implemented. Client computer(s)/devices 2050 and server computer(s) 2060 provide processing, storage, and input/output devices executing application programs and the like. Client computer(s)/devices 2050 can also be linked through communications network 2070 to other computing devices, including other client devices/processes 2050 and server computer(s) 2060. Communications network 2070 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 21:
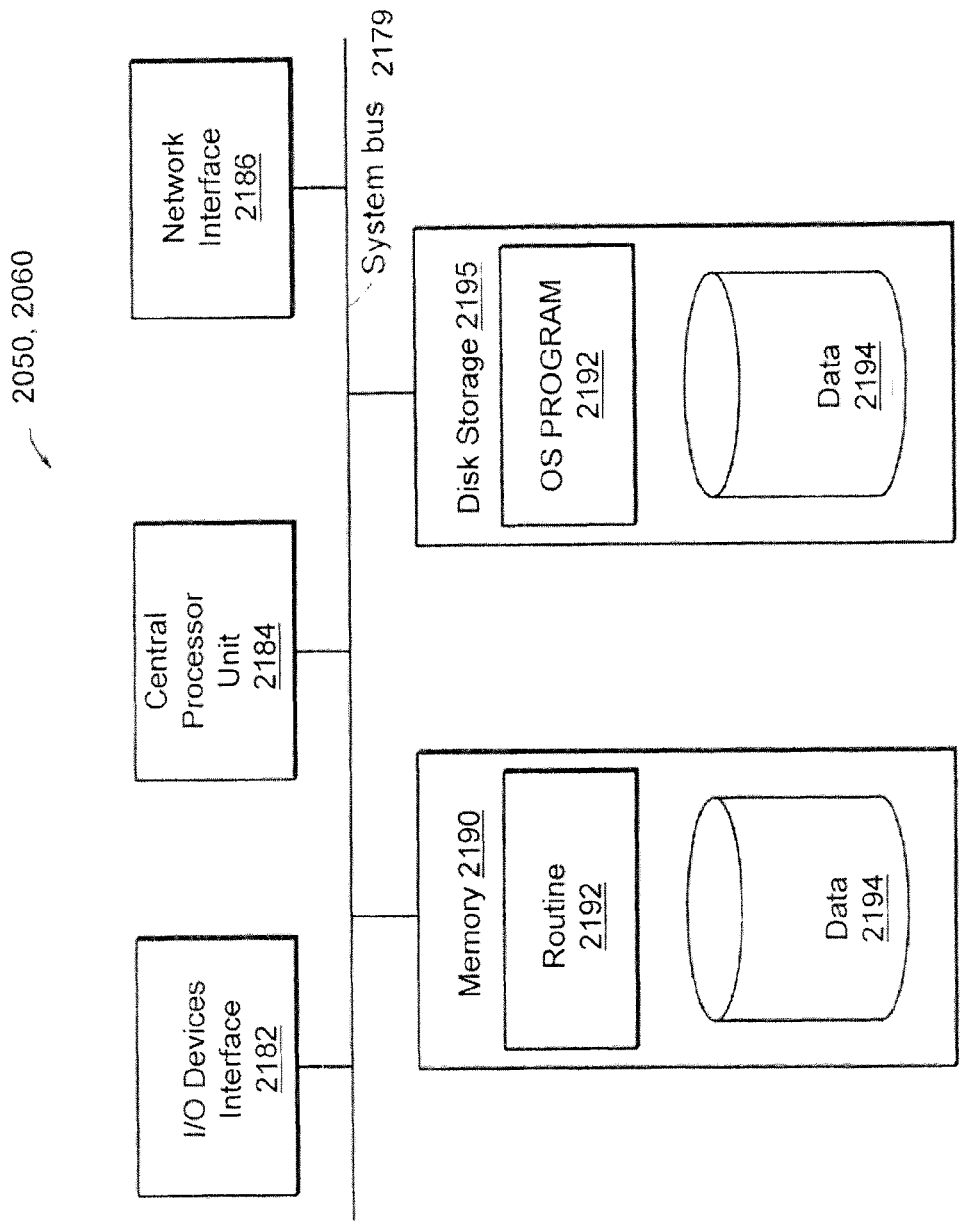
FIG. 21 is a block diagram of the internal structure of a computer of the network of FIG. 20.

FIG. 21 is a diagram of the internal structure of a computer (e.g., client processor/device 2050 or server computers 2060) in the computer system of FIG. 20. Each computer 2050, 2060 contains system bus 2179, where a bus is a set of hardware lines used for data transfer among the components of a computer or processing system. Bus 2179 is essentially a shared conduit that connects different elements of a computer system (e.g., processor, disk storage, memory, input/output ports, network ports, etc.) that enables the transfer of information between the elements. Attached to system bus 2179 is an Input/Output (I/O) device interface 2182 for connecting various input and output devices (e.g., keyboard, mouse, displays, printers, speakers, etc.) to the computer 2050, 2060. Network interface 2186 allows the computer to connect to various other devices attached to a network (e.g., network 2070 of FIG. 20). Memory 2190 provides volatile storage for computer software instructions 2192 and data 2194 used to implement an embodiment of the present invention (e.g., object models, codec and object model library discussed above). Disk storage 2195 provides non-volatile storage for computer software instructions 2192 and data 2194 used to implement an embodiment of the present invention. Central processor unit 2184 is also attached to system bus 2179 and provides for the execution of computer instructions.

In one embodiment, the processor routines 2192 and data 2194 are a computer program product, including a computer readable medium (e.g., a removable storage medium, such as one or more DVD-ROM's, CD-ROM's, diskettes, tapes, hard drives, etc.) that provides at least a portion of the software instructions for the invention system. Computer program product can be installed by any suitable software installation procedure, as is well known in the art. In another embodiment, at least a portion of the software instructions may also be downloaded over a cable, communication and/or wireless connection. In other embodiments, the invention programs are a computer program propagated signal product embodied on a propagated signal on a propagation medium 107 (e.g., a radio wave, an infrared wave, a laser wave, a sound wave, or an electrical wave propagated over a global network, such as the Internet, or other network(s)). Such carrier medium or signals provide at least a portion of the software instructions for the present invention routines/program 2192.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product is a propagation medium that the computer system may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 20-21 are for purposes of illustration and not limitation of the present invention.

The invention can take the form of an entirely hardware embodiment, an entirely software embodiment or an embodiment containing both hardware and software elements. In one preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code are retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A computer implemented method of recommending products and services comprising the digital processing steps of:
    processing a plurality of web-based user profiles generated by users to extract keywords;
    identifying which keywords commonly occur together in at least a portion of the plurality of web-based user profiles including:
        weighing the importance of an identified keyword to a subject user profile, where weighing the importance of an identified keyword to a subject user profile further includes increasing the importance proportionally to the number of times the identified keyword appears in the subject user profile offset by the frequency the identified keyword appears in the corpus of user profiles; and
        determining a percentage of co-occurrence for the identified keyword using a correlation index; and
    expanding keywords associated with a query with additional keywords, where the additional keywords are determined using one or more of the identified co-occurring keywords that commonly occur together in at least a portion of the plurality of web-based user profiles.

2. A computer implemented method as in claim 1 wherein identifying which keywords commonly occur together in the same user profiles further includes computing the frequency with which a keyword appears in conjunction with another keyword in at least a portion of the plurality of web-based user profiles.

3. A computer implemented method as in claim 2 wherein computing the frequency with which a keyword appears in conjunction with another keyword in at least a portion of the plurality of web-based user profiles further includes:
    computing the degree to which the two keywords tend to occur together;
    determining a ratio indicating the frequency with which the two keywords appear together; and
    determining a correlation index indicating the likelihood that users interested in one of the keywords will be interested in the other keyword, as compared to an average profile.

4. A computer implemented method as in claim 3 further including processing the computed degree, the determined ratio and the correlation index to determine a percentage of co-occurrence for each keyword.

5. A computer implemented method as in claim 4 wherein determining a percentage of co-occurrence for each keyword further includes using the percentage of co-occurrence to determine a correlation ratio indicating how often a co-occurring keyword is present when another co-occurring keyword is present.

6. A computer implemented method as in claim 1 wherein weighing the importance of an identified keyword to a subject user profile further includes using a scoring system employing a topic vector space model to produce relevancy vector space of related keywords.

7. A computer implemented method as in claim 6 wherein crawling user profiles further includes:
    analyzing user profiles; and
    extracting keywords from the analyzed user profiles.

8. A computer implemented method as in claim 1 wherein weighing the importance of an identified keyword to a subject user profile further includes using a term frequency—inverse document frequency (idf) weighting calculation to determine the value of the identified keyword as an indication of user interest.

9. A computer implemented method as in claim 8 further includes determining whether the identified keyword is a super node.

10. A computer implemented method as in claim 9 wherein a super node is a classifier that is identified by determining the overall frequency of its occurrence in the corpus of user profiles.

11. A computer implemented method as in claim 9 wherein determining whether the identified keyword is a super node further includes determining that the identified keyword is not a super node if the idf value of the identified keyword is below zero.

12. A computer implemented method as in claim 1 wherein the query includes the keywords to be expanded, where the keywords to be expanded describe targeting criteria for an advertisement.

13. A computer implemented method as in claim 12 wherein the advertisement is delivered in response to a user having one or more keywords in their profile that are the same as the keywords associated with the advertisement.

14. A computer implemented method as in claim 1 wherein processing the web-based user profiles further includes crawling user generated content from the user profiles on a social networking site to extract keywords.

15. A computer implemented method as in claim 1 wherein other online information is processed to identify keywords commonly occurring together, where the online information includes consumer buying behavior.

16. A computer apparatus embodied on a nontransitory computer readable storage medium for recommending products and services comprising:
- means for processing, using one or more computer processors, a plurality of web-based user profiles generated by users to extract keywords;
- means for identifying which keywords commonly occur together in at least a portion of the plurality of web-based user profiles;
- wherein the means for identifying keywords that commonly occur together in the same user profiles further including means for weighing the importance of an identified keyword to a subject user profile, where weighing the importance of an identified keyword to a subject user profile further includes increasing the importance proportionally to the number of times the identified keyword appears in the subject user profile offset by the frequency the identified keyword appears in the corpus of user profiles; and
- wherein the means for identifying keywords that commonly occur together in the same user profiles further including means for determining a percentage of co-occurrence for the identified keyword using a correlation index; and
- means for expanding keywords associated with a query with additional keywords, where the additional keywords are determined using one or more of the identified co-occurring keywords that commonly occur together in at least a portion of the plurality of web-based user profiles.

17. A computer apparatus embodied on a nontransitory computer readable storage medium for recommending products and services comprising:
- means for processing, using one or more computer processors, a plurality of web-based user profiles generated by users to extract keywords;
- means for identifying which keywords commonly occur together in at least a portion of the plurality of web-based user profiles including means for weighing the importance of an identified keyword to a subject user profile, where weighing the importance of an identified keyword to a subject user profile further includes using a scoring system employing a topic vector space model to produce relevancy vector space of related keywords; and
- wherein the means for identifying keywords that commonly occur together in the same user profiles further including means for determining a percentage of co-occurrence for the identified keyword using a correlation index; and
- means for expanding keywords associated with a query with additional keywords, where the additional keywords are determined using one or more of the identified co-occurring keywords that commonly occur together in at least a portion of the plurality of web-based user profiles.

\* \* \* \* \*